United States Patent [19]

Hill et al.

[11] E Re. 28,523

[45] Reissued Aug. 19, 1975

[54] HIGH STRENGTH ALLOY STEEL COMPOSITIONS AND PROCESS OF PRODUCING HIGH STRENGTH STEEL INCLUDING HOT-COLD WORKING

[75] Inventors: Morse Hill, Berea; Stephen J. Matas, Independence, both of Ohio

[73] Assignee: Republic Steel Corporation, Cleveland, Ohio

[22] Filed: Aug. 28, 1968

[21] Appl. No.: 771,681

Related U.S. Patent Documents

Reissue of:

[64] Patent No.: 3,366,471
Issued: Jan. 30, 1968
Appl. No.: 323,026
Filed: Nov. 12, 1963

U.S. Applications:

[63] Continuation-in-part of Ser. No. 169,076, Jan. 26, 1962, abandoned.

[52] U.S. Cl. ..... 75/123 K; 75/12.4; 75/125; 75/128 B; 148/31; 148/36

[51] Int. Cl.[2] ..... C22C 38/08; C22C 38/52

[58] Field of Search ..... 75/123 K, 128 B, 124, 125, 75/128 W, 128 G, 128 V

[56] References Cited

UNITED STATES PATENTS

| | | | |
|---|---|---|---|
| 1,428,534 | 9/1922 | De Clamecy | 75/128 |
| 1,522,813 | 1/1925 | Etchells | 75/128 |
| 1,630,448 | 5/1927 | Oertel | 75/128.9 |
| 2,532,117 | 11/1950 | Newell | 75/128 |
| 2,587,613 | 3/1952 | Payson | 75/128 |
| 2,695,229 | 11/1954 | Sheridan et al. | 75/128 |
| 2,852,422 | 9/1958 | Hess | 148/12.4 |
| 2,857,299 | 10/1958 | Epstein | 148/12.4 |
| 2,992,148 | 7/1961 | Yeo et al. | 148/36 |
| 3,244,514 | 4/1966 | Blower | 75/128 |

FOREIGN PATENTS OR APPLICATIONS

| | | |
|---|---|---|
| 405,643 | 1/1934 | United Kingdom |

*Primary Examiner*—L. Dewayne Rutledge
*Assistant Examiner*—Arthur J. Steiner
*Attorney, Agent, or Firm*—Raymond J. McElhannon, Esq.

[57] ABSTRACT

*High strength alloy steels and production thereof consisting essentially of about: 3 to 12% of metal of the group nickel and copper, copper when present not exceeding one-half the nickel content, 0.2 to 7% cobalt, up to 2% each of manganese, chromium and aluminum, up to 1.5% silicon, up to 3.5% molybdenum, up to 0.5% vanadium, up to 0.4% columbium, up to 0.25% tantalum, up to 0.75% tungsten, up to 0.1% boron, up to 0.3% carbon, and the balance substantially all iron.*

19 Claims, 12 Drawing Figures

INVENTORS
MORSE HILL
STEPHEN J. MATAS

INVENTORS
MORSE HILL
STEPHEN J. MATAS

IMPACT RESISTANCE AS A FUNCTION OF BAINITIC TRANSFORMATION TEMPERATURE OF HP 9-4-43 STEEL (HEAT 3950831)

INVENTORS
MORSE HILL
STEPHEN J MATAS

IMPACT RESISTANCE OF TEMPERED MARTENSITIC AND BAINITIC STRUCTURES AS RELATED TO YIELD STRENGTH IN HP 9-4-X ALLOY STEELS

IMPACT RESISTANCE OF TEMPERED MARTENSITIC AND BAINITIC STRUCTURES AS RELATED TO ULTIMATE TENSILE STRENGTH IN HP 9-4-X ALLOY STEELS

INVENTORS
MORSE HILL
STEPHEN J. MATAS

INVENTORS
MORSE HILL
STEPHEN J. MATAS

STRESS CORROSION CRACKING BEHAVIOR OF MATERIALS
(STRESSED AT 80% OF THE YIELD STRENGTH)
(IN A 3.5% NaCl SOLUTION)

INVENTORS
MORSE HILL
STEPHEN J MATAS

HIGH STRENGTH ALLOY STEEL COMPOSITIONS AND PROCESS OF PRODUCING HIGH STRENGTH STEEL INCLUDING HOT-COLD WORKING

Matter enclosed in heavy brackets [ ] appears in the original patent but forms no part of this reissue specification; matter printed in italics indicates the additions made by reissue.

---

This application is a continuation-in-part of our copending application Ser. No. 169,076, filed Jan. 26, 1962, and now abandoned.

This invention pertains to high-strength allow steels of novel composition, to methods of heat treating and of mechanically working and heat treating the same, for imparting excellent combinations of high-strength, ductility and toughness, and to the steels as thus processed for imparting these properties.

There has recently been substantial activity in the development of extremely high-strength alloy steels for aerospace and other structural components, such as vessels subjected in use to external pressure and impact, where strength-to-weight ratios are important. As a result, a number of newly developed steels have become available, which in general are superior to the steels previously available for such applications. Certain of these are described in copending applications of common ownership with the instant application, these comprising an application of J. P. Tarwater, Ser. No. 140,072, filed Sept. 21, 1961, and an application of J. T. Shimmim, Jr., et al., Ser. No. 206,182, filed June 29, 1962.

The researches resulting in said copending and instant applications, provide a series of allow steels, of relatively low alloy contents, which are characterized as appropriately heat treated or as mechanically worked and heat treated as hereinafter set forth herein, in excellent combinations of strength and ductility, combined also in general with good toughness.

Although a number of alloy steels have been recently developed by others, which are heat treatable to provide good combinations of strength and ductility, those of relatively low alloy content, although possessing excellent ductility and toughness as heat treated, are nevertheless somewhat deficient in strength as compared to those of substantially higher alloy content, while the latter in addition to being unduly expensive for this reason, nevertheless do not possess the combinations of ductility and toughness at the higher heat treated strength levels, of the steels of the instant and copending applications referred to.

In the steels of the instant invention, cobalt and nickel are essential constituents, in small to moderate amounts of about 3–12% nickel and 0.2–7% cobalt, together with carbon in the range of about 0.1–0.65%. Also in the steels of this invention which contain carbon over about 0.3%, one or more metals of the group chromium, molybdenum, vanadium and columbium must be present as an essential constituent in minimum total amount of about 0.1% and preferably about 0.2% The steels of the invention also in general contain small to moderate amounts of manganese and silicon and may also contain small amounts of each of aluminum, tantalum and tungsten. The broad composition range of the steels of the invention is as follows:

| Element | Weight percent of total alloy |
|---|---|
| Carbon | 0.10–0.65 |
| Nickel | 3–12 |
| Cobalt | 0.2–7 |
| Manganese | 0–2 |
| Silicon | 0–1.5 |
| Chromium | 0–2 |
| Molybdenum | 0–3.5 |
| Vanadium | 0–0.5 |
| Aluminum | 0–2 |
| Columbium | 0–0.4 |
| Tantalum | 0–0.25 |
| Tungsten | 0–0.75 |
| Boron | 0–0.1 |

and not over about 0.04% each of sulfur and phosphorus, the remainder being iron with incidental impurities.

The nickel content of any particular steel in accordance with the invention may be replaced by copper up to about one-third of the nickel content that would otherwise be used, the replacement being on a 1:1 percentage basis. Copper, therefore, will not exceed one-half the nickel content in the steel.

Part or all of the elements vanadium, aluminum and silicon may be replaced by one or more of the elements titanium, zirconium and the rare earth elements.

Within the above broad composition ranges there are preferred ranges for various elements, depending upon the carbon content and the end use of the steel as follows. For carbon contents below about 0.3%, the steel should preferably contain from about 0.5–1.5% each of chromium and molybdenum; while for carbon contents above this amount, chromium and molybdenum should preferably be present in amounts of about 0.25–0.5% each.

Where the end use of the steel is for high temperature applications, one or more of the elements of the group aluminum, silicon, tantalum and tungsten should be present on the high side of the above ranges therefor; whereas for normal atmospheric temperature applications, each of these elements when present, should be held to the low side of its range, and particularly in the case of aluminum the content thereof should be limited to about 0.02% maximum.

The steels of the invention may in general be subjected to martensitic hardening and strengthening, by first austenitizing and thereupon quenching with sufficient rapidity to a sufficiently low temperature, including refrigeration if necessary, to convert the austenite to substantially 100% martensite, and thereupon aging for about one to two hours at temperature within the range of about 400–1000° F., depending upon the temperature required for austenitizing any particular analysis.

This heat treatment in general imparts to the steel, particularly for the low carbon analyses containing not over 0.3% carbon, as shown by the test results hereinafter presented, excellent combinations of high yield and ultimate strength and high ductility and toughness for normal or atmospheric temperature applications. For example, a typical steel within the aforesaid low carbon range containing about 0.25% carbon, 9% nickel, 4% cobalt and 1% each of chromium and molybdenum, when austenitized, quenched and tempered at 1050° F., gave yield strengths on the order of 200 k.s.i. (thousands of pounds per square inch), ultimate tensile strengths on the order of 215 k.s.i., Charpy V-notch impact energy values of the order of 55 ft-lb. at room temperature and 35 ft-lb. at −320° F.

The aforesaid martensitic strengthening of these steels may also in general be improved by subjecting the steel to a certain amount of mechanical working or plastic deformation, as by forging or rolling, at temperature above that of martensite formation and outside the range of bainite formation, prior to quenching to produce martensite and thereafter tempering. That is to say, in accordance with this processing of the steels of the invention, the steel is mechanically worked at elevated temperature and in the austenitic state and thereafter the worked article is rapidly cooled toward and sometimes to or below room temperature in order to convert substantially all of the austenite to martensite while avoiding the formation of bainite. For example, if a time-transformation-temperature curve (hereinafter referred to as a "TTT curve" and wherein time at a constant temperature is plotted as abscissa on a logarithmic scale and temperature as ordinates on a straight arithmetical scale) be drawn which is characteristic of a particular steel according to the invention, there will be found an area at the left of the curve in which a certain amount of mechanical working can be accomplished within the time permitted prior to actual transformation taking place to one or more of the various transformation products, such as bainite, which are possible. If, therefore, the mechanical working (referred to herein as hot-cold working) is effected in this range, and the steel thereupon quenched to a sufficiently low temperature and with sufficient rapidity to convert substantially all the austenite to martensite, and the steel thereafter tempered, the aforesaid improved strength and ductility combinations will be obtained as shown by the test data presented below.

As regards this aspect of the invention, the prior art has almost always preferred to effect the working of alloy steels at a temperature not far above the start of martensite formation or the "$M_s$" line or temperature (shown on the TTT plot as a broken horizontal line). Thus, in the patent to Schmatz et al., No. 2,934,463, granted Apr. 26, 1960, there is shown in FIG. 2 thereof what is substantially a TTT curve of one particular kind having a lower nose or loop portion immediately above the $M_s$ line where transformation to lower temperature products, particularly bainite, starts. In this same drawing of the Schmatz et al. patent, there is an upper loop portion of the curve having a nose extending to the left which is somewhat over 1200° F. in temperature. The teaching of Schmatz et al. is to operate in a so-called "deformation range" which is in the bay between these two loop portions of the TTT curve. This is possible with certain alloys giving the type of curve shown in FIG. 2 of the Schmatz et al. patent.

However, it has been found undesirable to work some steels in this temperature range or in this bay for the reason that the actual working which is done operates to shift the lower loop portion of the TTT curve substantially to the left, so as to make it difficult, and sometimes substantially impossible, to cool the worked specimen or piece to room temperature without there being a substantial amount of the original austenite transformed to products other than martensite, usually to bainite, which is undesirable in the martensitic strengthening of steels according to the present invention.

It has been found in accordance with a further aspect of the invention that while the strength of the steel of the invention may be greatly increased by the martensitic heat treatment, with or without prior mechanical working in the manner aforesaid, that nevertheless the resulting toughness of the steel processed in this way is not as great as that obtainable by first austenitizing and thereupon quenching to a temperature above that of martensitic formation, followed by holding or isothermal transformation to a substantially complete or fully bainitic structure. This isothermal heat treatment of the steel of the invention to form substantially complete bainite therefore constitutes a further feature thereof for securing high strengths combined with the highest degree of toughness obtainable for any particular composition of the steel. The formation of this bainitic structure may also be preceded to advantage by hot-cold working in the same manner as above described with reference to the formation of the martensitic hot-cold worked structures.

It is also a part of the present invention, from the point of view of processing, that the steels of the invention may be used in an as-cooled or quenched condition, or may thereafter be tempered in a manner similar to the tempering operation used on other steels following the heating and quenching thereof.

It has also been found that while the martensitic processing hereinabove set out, is efficacious generally in converting a large portion of the austenite (to which the composition is completely converted by the original high heating and which still remains following the hot-cold working portions per se of the process) to martensite, certain additional features may be resorted to in order to minimize the percentage of austenite which is retained unconverted at the completion of the process. This conversion is believed to be promoted by a judicious selection of the amounts of certain of the alloying ingredients. It may also be effected by resorting to very low temperatures to which the material is subjected following the original quenching or cooling substantially to room temperature, for example, by reducing the temperature of such material down to the temperature of liquid nitrogen, i.e., about −320° F. These results can similarly be obtained by lowering the temperature to or approaching the $M_s$ temperature (i.e., that temperature at which conversion of austenite to martensite is finished or completed) by any other temperature controlling means. Further strengthening of the product by converting more of the retained austenite can be obtained if, after the temperature is originally lowered to a subzero value, the material is then brought up to a tempering temperature of, for example, about 600° F., held for a time at that temperature, and then again quenched to substantially room temperature and then chilled to a subzero temperature. The repetition of this heating to tempering temperature and chilling to a subzero temperature, all relatively rapidly, i.e, in not over about one day, serves to convert a little more of the austenite, each time, to martensite. Usually two such cycles are sufficient to obtain the optimum results considering the cost of further repetitions of this portion of the process.

Inasmuch as the present invention pertains both to the alloy steel composition and to the process applicable thereto as above described, it is important to note that the processes per se may also be used on other compositions and, therefore, are not restricted to use with the particular compositions herein disclosed and claimed as such.

Other and further objects of the present invention will become apparent from the following particular disclosure and will be more specifically pointed out hereinafter.

In the accompanying drawings:

FIG. 1 is a chart showing the relationship of carbon and cobalt required in order to obtain different strengths in steels according to the invention as subjected to the martensitic heat treatment consisting of austenitizing and quenching to martensite followed by tempering, the strengths in each instance being attained not only as a function of the composition itself, but also of the quenching and tempering treatment.

Figure 2:
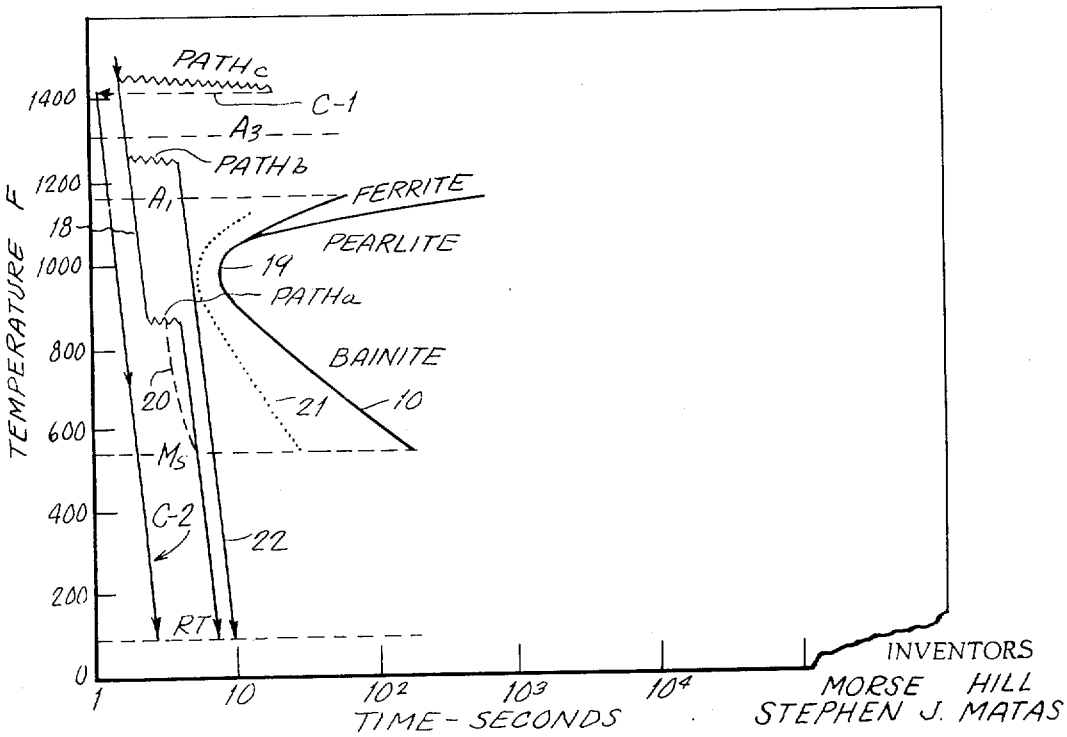
FIG. 2 is a graphical plot of one type of the TTT curve for one alloy steel composition, the details of which are given hereinafter in discussing this subject matter, showing also the effect of working in various ranges and the results thereof.
Figure 3:
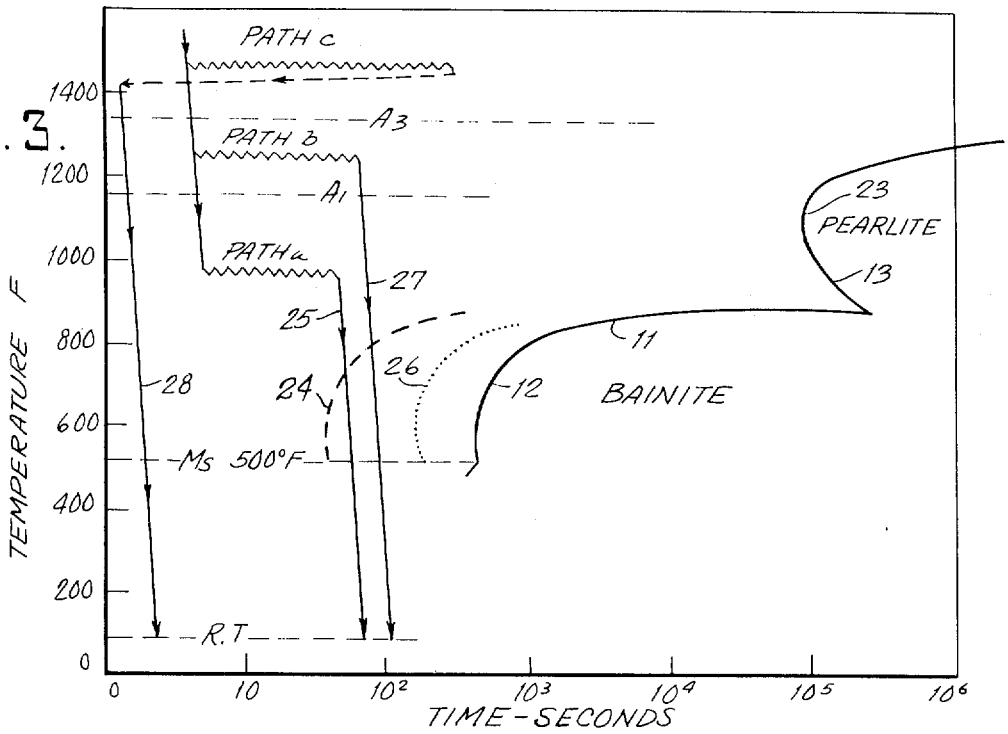
FIG. 3 is a similar TTT curve for another alloy steel composition as given below, in this instance a double lobe curve wherein the upper lobe indicates transformation to higher temperature transformation products such as ferrites and pearlites, while the lower lobe shows transformation to lower temperature transformation products such as bainite.
Figure 4:
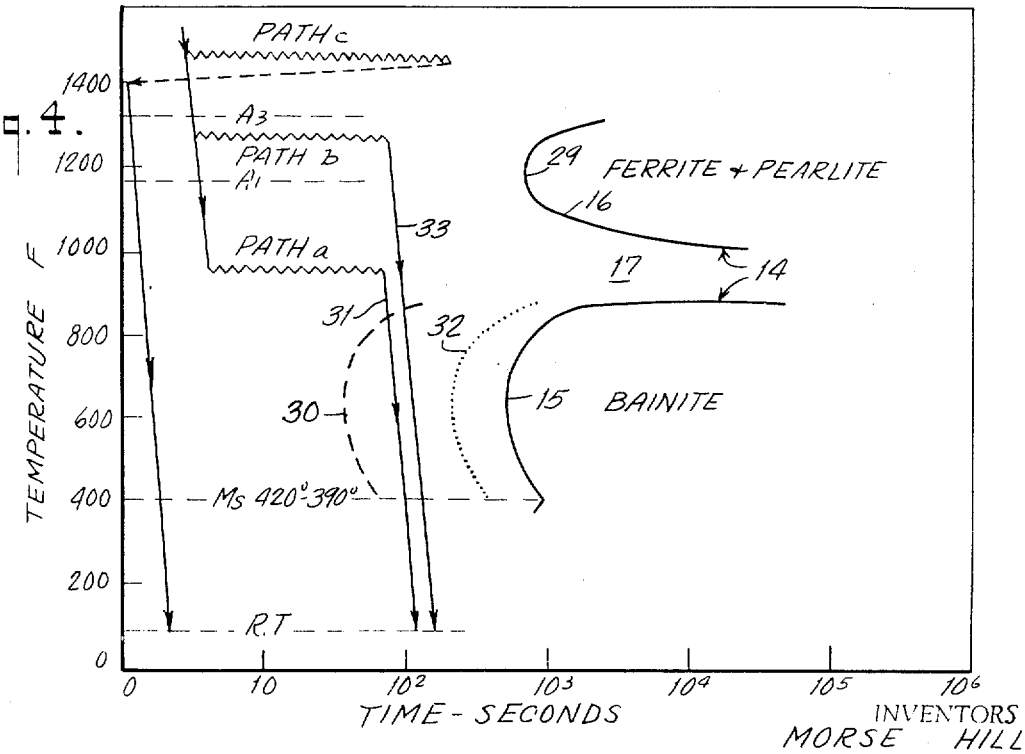
FIG. 4 is a TTT curve similar to FIG. 3 for another alloy steel composition as given below.

In FIGS. 2, 3 and 4 there are also illustrated the effects of working in different temperature ranges as will be explained hereinafter.

Figure 5:
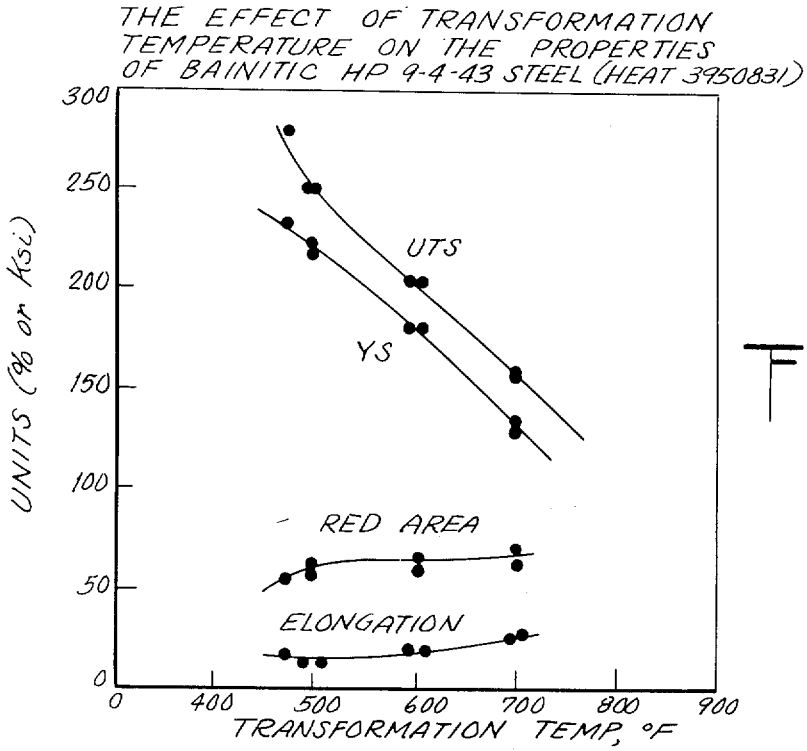

FIG. 5 is a graphical chart showing the room temperature tensile properties of certain steels according to the invention as heat-treated to impart thereto a bainitic microstructure and wherein the austenite-to-bainite transformation temperatures are plotted as abscissae against the corresponding tensile properties as ordinates.

Figure 6:
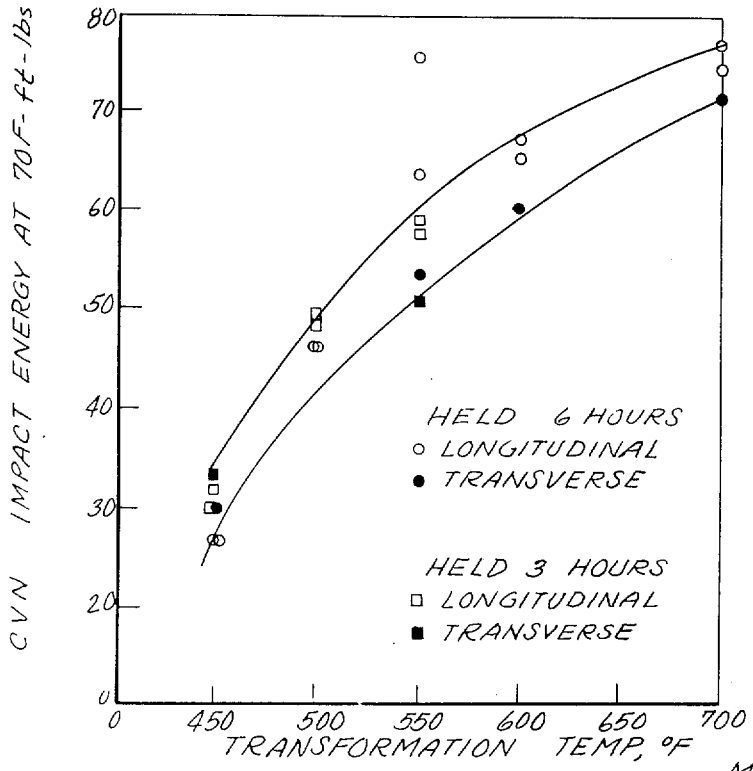

FIG. 6 is a graphical chart somewhat similar to FIG. 5 and showing for the same steels thereof, the relationship between bainite transformation temperatures plotted as abscissae against the corresponding Charpy V-notch (CVN) impact energy values at room temperature plotted as ordinates.

Figure 7:
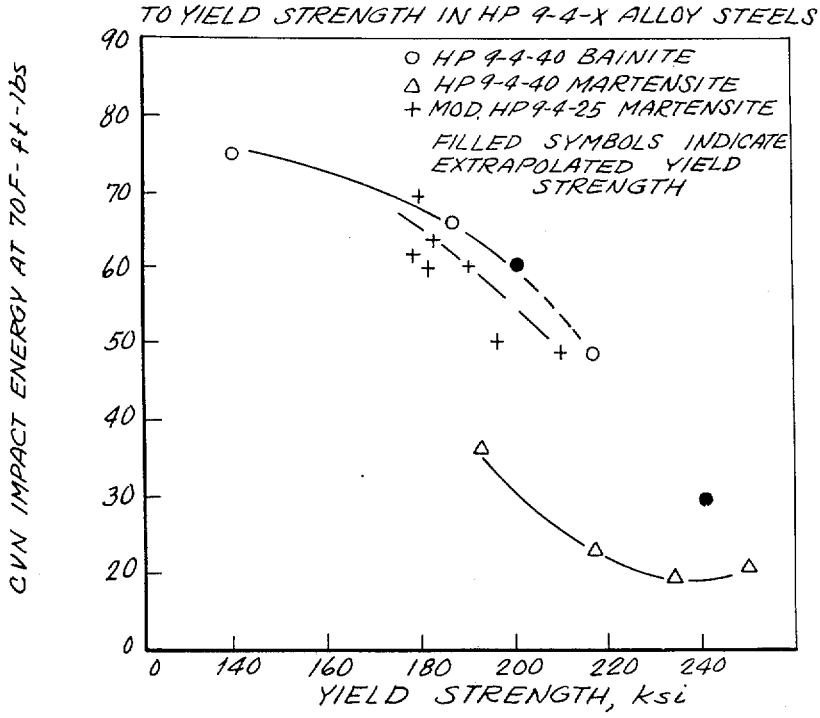
Figure 8:
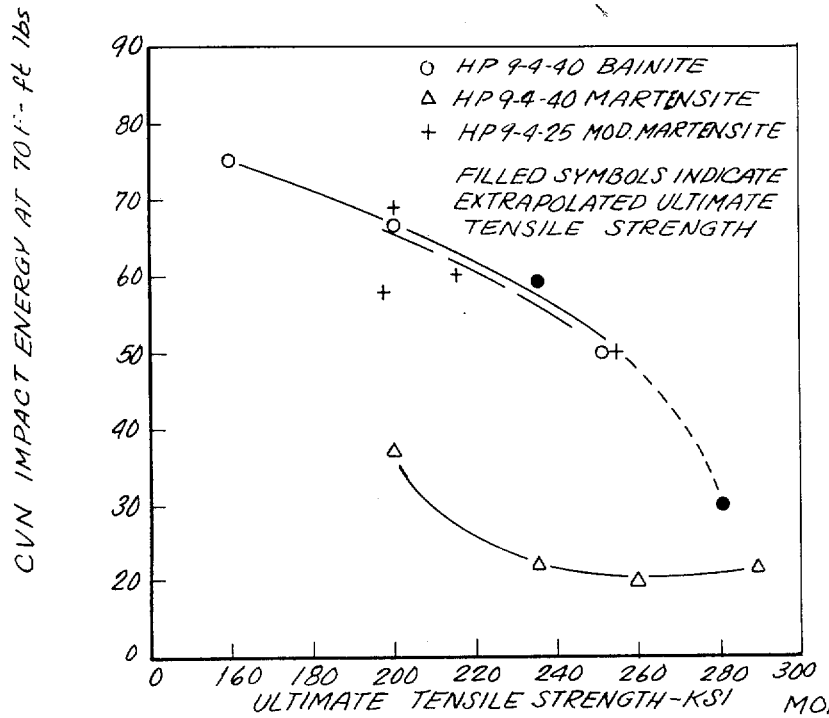

FIGS. 7 and 8 are graphical charts in which are plotted, respectively, the relationship between yield strength and ultimate strength plotted as abscissae against the corresponding Charpy V-notch impact energy values at room temperature, for steels in accordance with the invention heat-treated to provide a bainitic structure on the one hand versus heat treatment to provide a martensitic structure on the other.

Figure 9:
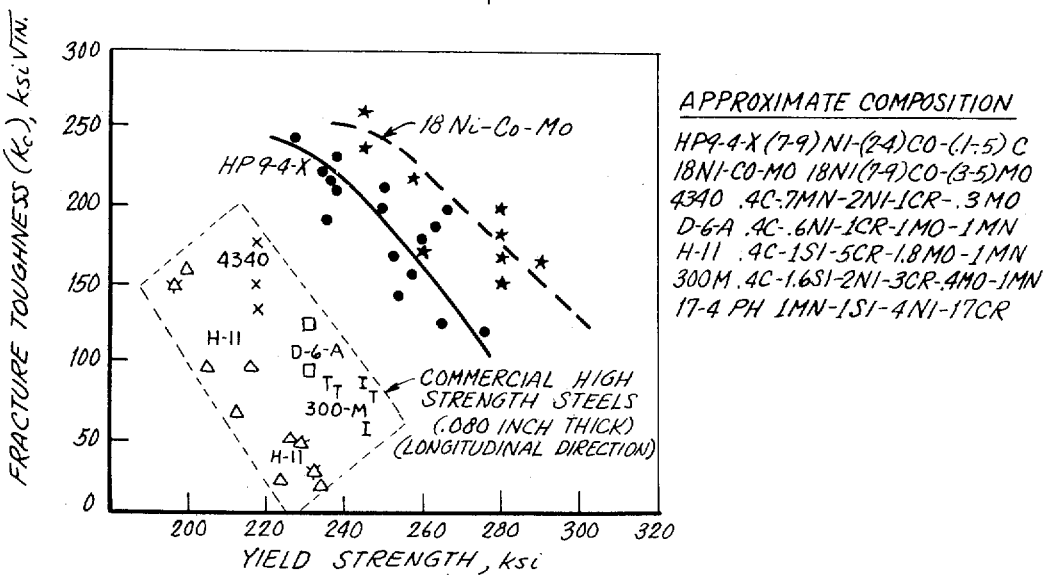
Figure 10:
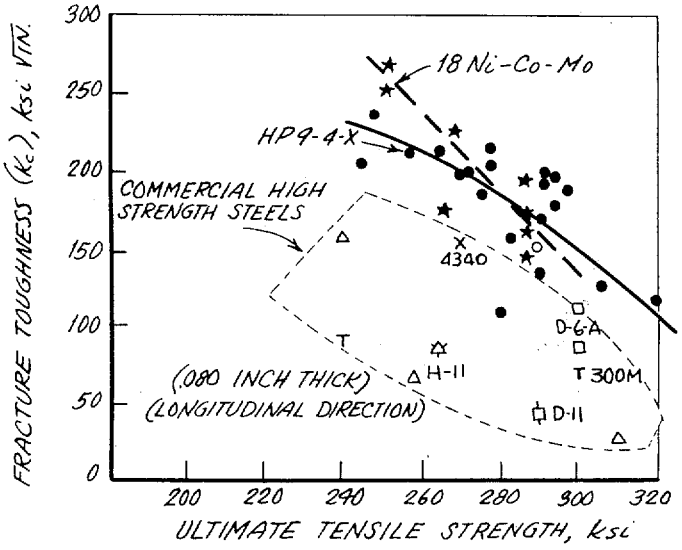

FIGS. 9 and 10 are graphical charts in which are plotted, respectively, the relationship between yield and ultimate strength, plotted as abscissae, against the corresponding fracture toughness values, plotted as ordinates, for the steels of this invention as compared to the best competitive steels for similar applications, the steels of this invention being designated on these charts as "HP 9–4–X."

Figure 11:
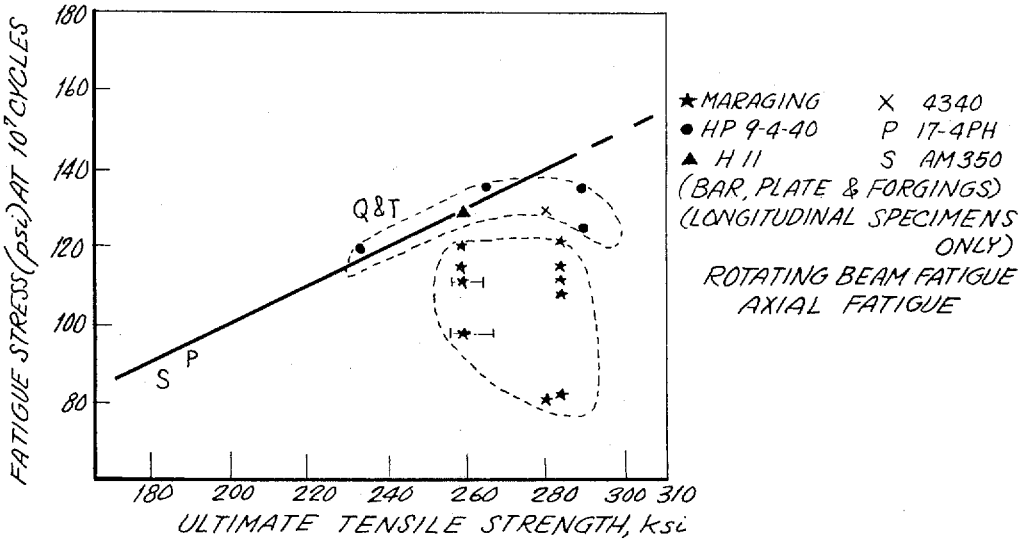

FIG. 11 is a somewhat similar graphical chart in which is plotted the relationship between ultimate strength, plotted as abscissae, against the corresponding fatigue stress values, plotted as ordinates, of steels according to the present invention as compared to various competitive steels.

Figure 12:
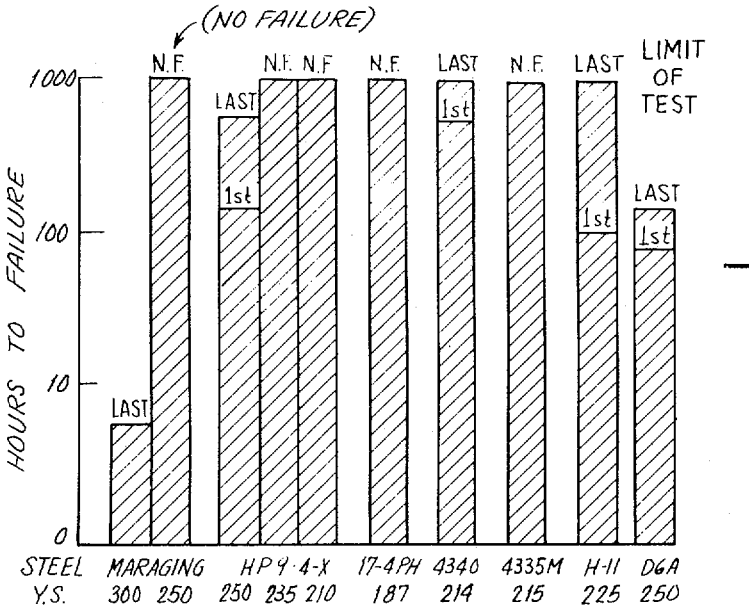

FIG. 12 compares the stress corrosion cracking behavior of steels according to the present invention with the best of the competitive steels for similar applications.

Figure 1:
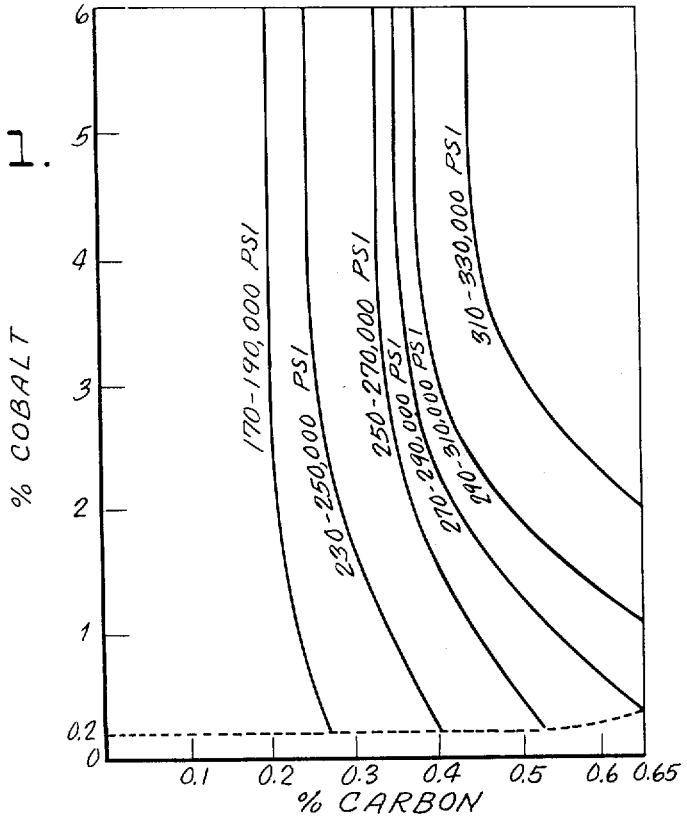

Referring to FIG. 1 of the drawings, the curves shown represent the results of a considerable number of tests, in each of which steels according to the invention, containing about 8 to 9% nickel were used, but with different amounts of carbon and cobalt. In these tests the several samples were each austenitized at a temperature of about 1475° to 1500° F., then oil quenched to room temperature, then further cooled to the temperature of liquid nitrogen, following which they were tempered for one hour at 600° F.

The curves shown in FIG. 1 are reasonably characteristic of the tests for the several compositions under the conditions given. In the event, however, that the temperature of tempering were shifted, for example, by lowering such temperature to about 400° F., then the several curves would be respectively nearer to straight up and down and vice versa. The break in the curves from an approximately straight line to the curved portions in the bottom of FIG. 1 would, under all circumstances, be at about 3% cobalt.

In the event that the nickel content of the samples were varied from the range for which the curves were drawn, i.e., about 8 to 9% nickel, then the curves of FIG. 1 would be shifted so as to require somewhat higher amounts of carbon in proportion to lower amounts of nickel, with the usual expected variation about 0.02% change in the content of carbon for each percent change in the content of nickel from the conditions for which the curves were drawn as aforesaid.

In the event that the conditions of treatment of the several samples were changed from those given above, including the cooling to the temperature of liquid nitrogen prior to the tempering operation, so as to omit this cooling operation and to quench these several samples only down to about room temperature, then the resultant bodies would have somewhat lower tensile strengths, respectively, but the curves would be all of the same general shape for the somewhat lower tensile strengths, respectively. It is generally satisfactory, if the amount of cobalt present in somewhat more than the minimum given in view of the carbon present, all within the outside limits above set out. If steels are formed with some retained austenite as is usually the case, there may be a tendency at some future time for some of this austenite to convert to martensite. Inasmuch as this conversion is accompanied by an increase in volume, there tends to be dimensional instability for the article formed from this steel which sometimes is sufficiently severe as to cause failure of the article in use. This undesired effect of the subsequent conversion of austenite to martensite is apparently decreased by the presence of some cobalt in the alloy, as cobalt seems to help in minimizing retained austenite.

As above stated for the steels of the invention containing [not] more than about 0.3% carbon, it is required that there be present a minimum of about 0.1% and preferably about 0.2% in total amount of one or more metals selected from the group consisting of chromium, molybdenum, vanadium and columbium. This requirement will be further discussed in connection with the discussion of these and other elements. In support of this, it has been found that in all samples which contained at least this amount of one or more of these metals, no graphite was observed under any conditions of heat treatment to which these samples were subjected. On the other hand, in samples wherein the total metal of this group was under about 0.1% graphite was produced as a result of heat treatment; its presence was detected in subsequent metallographic examinations; and the resulting samples had substantially lower strengths.

The next requirement to be mentioned generally at this point is that with higher percentages of one or more of the elements carbon, chromium or silicon, there should be higher percentages of cobalt and/or nickel in accordance with this invention in order that the best results be attained. Here again, the reasons for this are discussed hereinafter in connection with the discussion of these other elements and their purposes in the alloy.

The first element to be discussed is carbon, which is present to impart strength to the steel and also hardenability. The carbon may be present over a relatively wide range which may be broken down into a low carbon range of about .10–.3%, a medium carbon range of about 0.3–0.5%, and a higher carbon range of about 0.5–0.65%. Alloy steels in these several ranges have generally somewhat different purposes, even though all of them have many attributes in common.

The steels having a low carbon range of up to 0.3% in general have good weldability, high impact strength and very good notch or toughness properties. Such steels are useful for missile cases and vessels subjected in use to external pressure and impact. Steels in this carbon range after heat treatment have moderate yield strengths in the order of magnitude of 150,000 to 240,000 p.s.i., and moderate ultimate tensile strengths of about 180,000 to 300,000 p.s.i., these figures being given assuming the proper selection of other alloying ingredients in accordance with the invention.

Whenever yield strength is referred to herein, what is meant is the 0.2% offset yield strength as that term is used conventionally in this art.

Steels in the medium carbon range of about 0.3–0.5% have, after heat treatment, substantially higher yield strengths in the order of 235,000–270,000 p.s.i., and ultimate tensile strengths in the order of 280,000–340,000 p.s.i. These steels are also weldable and have high toughness or notch strength.

Steels in the higher range of carbon, i.e., 0.5–0.65%, after heat treatment, are quite hard and have very high yield and tensile strengths and moderately good toughness. Certain of these steels in the lower range of carbon of this high range thereof are weldable, using appropriate welding techniques. These steels have yield strengths in the general order of about 260,000–300,000 p.s.i. and ultimate tensile strengths in the order of about 320,000–350,000 p.s.i. or somewhat higher. The toughness of these steels is not as good as that of those in the medium carbon range aforesaid, but may be adequate for certain purposes where great hardness or very high strength is required.

In general it is found that high values of hardness and high ultimate tensile strength appear to occur together and are reasonably proportional to one another, so that for rapid testing purposes, it is often sufficient to make a test of hardness with the reasonable assurance that this test result is also characteristic of strength.

The next element to be discussed is nickel, which is present in steels according to the present invention from about 3% to about 12%; and in a more preferred range, from about 6½% to about 9½%. The purposes of this element in the steel are: (1) to increase the toughness and strength; (2) to increase the tolerance of the steel for embrittling agents, such as silicon, carbon, phosphorus and sulfur; and (3) to increase the hardenability of the steel.

It is found that as the percentage of the nickel is increased, the tendency to form graphite on heat treatment is increased; but this undesired tendency can be suppressed by the presence in the steel of carbide-forming elements such as one or more of chromium, molybdenum, vanadium and columbium. Some or all of these elements should be present in the steels according to the present invention, which is the reason that there is stated as a general limitation on the composition that there shall be present at least about 0.1% of one or more elements of the group chromium, molybdenum, vanadium and columbium, particularly where the carbon content is over about 0.3%.

It has also been found that as the percentage of the nickel in the steel is increased, the amount of austenite after quenching, tends to increase. This is so for any given value of carbon and is an undesired characteristic where the martensitic heat treatment is employed. It is found that the more carbon, the more pronounced this tendency. This tendency to retain austenite is, however, opposed by the addition of cobalt, which is one of the reasons that cobalt is desired in alloys according to this invention.

It has further been found that as the percentage of nickel is increased, the tolerance for silicon and carbon in the steel increases, while still maintaining a given toughness. This is important as silicon and carbon are both classifiable not only as hardening agents, but also as embrittling agents and hence tend to decrease toughness. Toughness can, however, be retained with substantial amounts of silicon and/or carbon in steels of the invention containing substantial amounts of nickel.

Copper, as stated, may be employed as a substitute for nickel in amount up to one-third the nickel that would normally be employed in an alloy according to the invention, the substitution being on a one-to-one percentage basis. Ordinarily, however, not more than about 2% copper would thus be substituted as this represents about the upper limit for solubility of copper in most compositions according to the invention.

The next element for consideration is cobalt, which should be present in the steel in an amount from about 0.2% to about 7%, with a preferred range of about 1% to about 4%. Cobalt serves the purpose of reducing retained austenite in the martensitic heat treatment, in that it acts to increase the $M_s$ temperature, i.e., the temperature where austenite starts to convert to martensite. Thus, the higher the $M_s$ temperature, the more austenite is transformed to martensite at a given quenching temperature, for example, room temperature, which is always below the $M_s$ temperature.

Cobalt also serves to increases the strength of the steel without substantial loss of toughness. It serves to give improved strengths, particularly in the low carbon steels, which is another reason for including certain minimum amounts of cobalt when the carbon is in the lower range.

Cobalt further increases the hot hardness of steel and increases the tempering resistance of steel, particularly in conjunction with silicon. Steels containing cobalt can, therefore, be tempered at relatively high temperatures and still retain desired strength. Cobalt further reduces the possibility of quench-cracking, which is the cracking that occurs incident to changes (increases) in dimensions due to the conversion of austenite to martensite. Also, cobalt increases the tolerance for certain embrittling agents such as carbon and silicon, and in this sense acts in a manner similar to nickel.

Manganese is similar in some of the characteristics provided thereby to silicon, in that both provide some degree of hardenability for the steel alloy. Generally, a residual of manganese is maintained to combine with sulfur, so as to prevent hot workability difficulties. However, with a judicious selection of raw materials, the manganese additions may be reduced or wholly omitted. The maximum of about 2% is chosen, as there is no apparent improvement in the characteristics of the steels of the invention with greater amounts of manganese. Thus the upper limit is not a critical limit, but is one dictated to the maximum extent at least by economic factors, rather than by factors having to do with the technical properties of the product.

Silicon is generally found in steels to some extent and has generally the function of retarding the tempering reaction at tempering temperatures of 600° F. and under. Generally, silicon is added to combine with oxygen in the melt; however, with special melting techniques, the silicon may be wholly omitted. The maximum value of silicon of about 1.5% is chosen for the reason that as the amount of silicon is increased, the final product tends to become more and more brittle even in the presence of other elements acting to increase the tolerance of the alloy to embrittling agents. Values greater than about 1.5% in the alloy combinations of the presness to the product.

As aforesaid, the effect of the presence of silicon may not be considered alone as the embrittling action of silicon can be offset to some extent, or silicon can be tolerated in substantial amounts without undue embrittlement of the final product, by the presence of nickel in the alloy, cobalt or a total of both, as both serve about the same purpose in this respect.

In the higher carbon range above about 0.3%, chromium and molybdenum as well as columbium and vanadium prevent graphitizing in steels of the invention during heat treating. In this respect, chromium and molybdenum act in a similar manner; and it is necessary for this purpose only that there be included in the steel, sufficient amount of one or more of these elements to prevent this. It is to be noted in this connection that the nickel present in these steels, increases the tendency to graphitize the same, and, therefore, in order to prevent graphitizing, there is required a greater amount of one or more of the above elements than if nickel were omitted. For the steels of the invention containing carbon within the lower range aforesaid, i.e., not over about 0.3%, chromium and/or molybdenum serve primarily to strengthen the steel by carbide precipitation therein, thus to impart secondary hardening to the steel.

In the higher carbon range above about 0.3%, chromium and molybdenum further serve to increase the hardenability of the steel, but in this respect it is desirable to minimize the amount of these elements present, as too much tends to result in an undesired amount of retained austenite on quenching, which gives undesired properties to the final products, i.e., steel which is less hard and in general, less strong. Excessive amounts of chromium and/or molybdenum may also result in a phase which imparts embrittlement of the final product. Chromium and molybdenum further act to intensify the action of other alloying ingredients such as nickel, manganese and vanadium, in increasing hardenability.

For all these reasons, the amount of chromium present for the purposes of the present invention is selected as within the range of zero to about 2%, and molybdenum within the range of about 0–3.5%. For carbon contents below about .30, the chromium content is preferably about ½ to 1½, while *for* carbon contents above this amount the chromium is preferably between about ¼ and ½ percent, and these same preferred limits also apply to molybdenum.

As a possible alternative, it is found that some of the molybdenum and/or chromium otherwise required, may be replaced by tungsten on an equivalency basis of three parts by weight of tungsten for each part by weight of chromium and/or molybdenum.

Sulfur and phosphorus are both undesired ingredients of the steel of the present invention, as is usual with many steels and for the same reasons, one giving embrittling action when the steel is hot and the other when it is cold. For these reasons these two elements are tolerated only to the extent that they are not unduly harmful, taking into consideration the purpose for which the final product is to be used. The preferred composition is to minimize both these elements. For this reason the maximum as to each is herein given as about 0.04%; although it is preferred for many uses that that maximum shall not exceed 0.01%.

Vanadium is present in these steels to the extent from zero to about 0.5%, with a preferred range for low or ambient temperature applications of about 0.05–0.15%. This element acts as a grain refiner for the austenite and hence for that of the martensite or bainite to which the austenite is converted in the hardening heat treatment. It also increases the hardenability of the steel, suppresses graphitizing and intensifies the action of other alloying elements, particularly chromium, molybdenum, manganese and nickel.

Aluminum may be present in these steels over the broad range of about 0–2%, with higher contents within this range for high temperature applications, and in only residual amounts of about 0.02% max. for normal or atmospheric temperature applications. This element operates as a grain refiner for the austenite and hence that of the martensite or bainite to which the austenite is converted (in a manner somewhat similar to vanadium as aforesaid), and also serves as a deoxidizer for the steel, and under some circumstances it increases the strength thereof. It is noted, however, that as the content of the aluminum is increased, there is increasing difficulty incident to the presence of bubbles or cracks in the ingots. For this reason, the upper limit of aluminum becomes quite important.

Columbium and/or tantalum may be wholly absent from the steel of the invention or may be present up to about 0.4% for columbium and up to 0.25% for tantalum by weight of the entire alloy. When used, their purpose is to prevent grain coarsening, to increase the hardenability of the steel and to raise its yield strength and its ductility when the material is subjected to tension. For higher temperature applications of this steel, these elements also impart added strength and stability.

It is also possible and is within the purview of the present invention to replace a part or all of the elements vanadium, aluminum and silicon with one or more of the elements titanium, zirconium and the rare earth elements for the purposes for which the replaced elements are intended as aforesaid. Titanium in addition increases the age hardenability of the steels.

It is further contemplated, in accordance with this invention, to utilize boron in amounts of up to about 0.1% to increase the hardenability of the steels in partial replacement for some of the elements vanadium, silicon, manganese, chromium, molybdenum and nickel.

Turning now to the process phases of the invention, there are shown in FIGS. 2, 3 and 4, different TTT curves (time, transformation, temperature) for different compositions of alloys, it being understood that each composition has its own characteristic TTT curve. The compositions of the steels for which these curves are drawn are given in the following table:

| Element | FIG. 2 | FIG. 3 | FIG. 4 |
|---|---|---|---|
| Carbon | 0.51 | 0.44 | 0.42 |
| Nickel | 6.28 | 8.00 | 8.25 |
| Cobalt | —— | 3.86 | 3.80 |
| Manganese | 0.23 | 0.10 | 0.34 |
| Silicon | 0.17 | 0.23 | 0.10 |
| Chromium | 0.04 | 0.22 | 0.18 |
| Molybdenum | 0.01 | 0.40 | 0.09 |
| Vanadium | —— | 0.08 | 0.08 |
| Sulfur | 0.017 | 0.010 | 0.10 |
| Phosphorus | 0.006 | 0.009 | 0.010 |

and the remainder being iron with incidental impurities.

Also referring to FIGS. 2, 3 and 4, it is noted that in FIG. 2 there is only a single lobe curve 10, the curve being shown in full lines and representing the isothermal transformation curve for the particular alloy in question. In FIG. 3, the full line TTT curve 11 has two lobes including a lower lobe 12 and an upper lobe 13. In FIG. 4 there is shown a still further type of TTT curve, indicated generally at 14, and including a lower lobe 15 and an upper lobe 16 which are spaced apart by a bay area shown at 17. It is noted that the TTT curve in each of FIGS. 2, 3 and 4 indicates the start of isothermal transformation from austenite into the several transformation products. The lower lobe 12 of FIG. 3, and 15 of FIG. 4, indicates transformation to the lower temperature transformation products such as bainite, while the upper lobe 13 of FIG. 3 and 16 of FIG. 4, indicates transformation to higher temperature transformation products such as ferrite and pearlite.

There is also shown on each of FIGS. 2, 3 and 4 a line designated $M_s$ which indicates the temperature for the start of transformation from austenite to martensite. Above this line is a horizontal line $A_1$ which indicates the lower end temperature of a critical zone. The upper end temperature of this critical zone is indicated by a line $A_3$. In this critical zone there may be one or more phases present in equilibrium with austenite; while above the $A_3$ line nothing but austenite can exist.

The process phase of the present invention comprises working on a relatively cold working basis, but still at relatively high temperatures, so as to be properly described by the term "hot-cold working." The working in accordance with the present invention is preferably held to that area above the nose of the curve wherein transformation may occur from austenite to the higher temperature transformation products such as ferrite and pearlite.

It has been found that when working is effected at temperature substantially above room temperature and in the temperature areas for which the several TTT curves of FIGS. 2 to 4 are drawn, that the working itself results in a shifting of the position of the TTT curves, which shifting is also illustrated in the accompanying drawings as hereinafter described in greater detail. In order to obtain a product which is not contaminated with some of the transformation products, such as bainite, but which is substantially solely martensite with a minimum amount of retained austenite, it is found necessary to work in accordance with the present invention. In this case, however, the term "martensite" is intended to mean that martensite-like product which is formed from the mechanically deformed austenite.

Referring now to FIG. 2, samples of the steel were first heated to an austenitizing temperature in the order of magnitude of 1400° to 1500° F.; then following this austenitizing, which served to convert substantially all the material to austenite, the samples were cooled or chilled down to a working temperature. In FIGS. 2 to 4 of the drawings the working in each instance is shown by a zig-zag, substantially horizontal line, indicating that it was effected at a substantially constant temperature, although it is contemplated as hereinafter set out that the actual working may be effected during a progressive diminution in temperature as might be occasioned, for example, by exposing the material being worked to relatively cooler working tools of an appropriate nature considering the type of working being used. In each instance in FIGS. 2, 3 and 4, the working temperature and time is indicated by the position and length of the zig-zag working line, the latter as measured in respect to the horizontal logarithmic time scale. This original chilling prior to the working which is shown by a sloping line, as at 18 in FIG. 2, from a relatively high austenitizing temperature, is and must be effected in a sufficiently short time so that this mere chilling action per se does not result in the transformation of any substantial amount of the material being handled to one or more types of transformation products other than austenite.

First considering the working in accordance with path a in FIG. 2, it is noted that this is accomplished at a temperature somewhat under 900° F. and definitely below the temperature of the nose of the curve 10 which is at approximately 950° F. and is shown at 19. It is found that when working is accomplished as shown by path a, the position of the curve 10 is shifted incident to and as a result of the working to that indicated in part by the dashed line 20. Thus the working which is indicated by the zig-zag portion of the line of path a operates to cause the line indicative of the condition of the specimen to pass within and to the right of this dashed line 20, which in turn indicates that a portion at least of the material of the specimen has been converted to some transformation products other than martensite. This is undesired in accordance with the present invention where martensite is the desired end product. In accordance with FIG. 2 it is therefore preferred to operate on one or the other of the upper paths b or c.

Path b shows a path for substantially isothermal working which is done at a temperature in the critical zone between the temperatures $A_1$ and $A_3$. In operating in this zone, which is substantially above the temperature of the nose of the curve at 19, it is found that the shifting of the curve 10 incident to working is much less than when operating at a lower temperature (path a), so that the curve 10 is shifted a lesser amount and substantially to the position shown by the dotted line curve 21. Under these circumstances, when the working is done in accordance with path b at a temperature substantially above that of the nose 19 of the curve 10, the subsequent chilling or quenching of the specimen will not intersect the dotted line curve 21; and hence there will be no higher temperature transformation products such as bainite present to contaminate the martensite to which the austenite is converted. The working path then is in accordance with the zig-zag working portion of path b followed by the inclined portion 22, showing the chilling of the worked specimen thereof down to room temperature (about 75° F.) and preferably below that in order that a maximum amount of the austenite shall be transformed to martensite. Here again it is not the original austenite which is transformed, but rather a worked type of austenite including the strains and crystal elongations and distortions effected therein by the cold working, done in this case under high temperature conditions. This hot-cold working uses much less power than if the working were done at lower temperatures, and consequently is much more economical in practice. In addition the strengthening effect of the hot-cold working is not destroyed on quenching the worked material to martensite, and hence enhances the strengthening action of the martensitic transformation. Subsequent tempering of the quenched material likewise does not destroy the strengthening effect of the hot-cold working as shown by the test results presented below.

When the working is done at a temperature above the $A_3$ line of FIG. 2, for example as in path c, a different set of conditions comes into play. Under these circumstances the working does not serve substantially to change the position of the principal curve 10 as the working is being accomplished in the stable austenite zone. Furthermore, the time period for cooling with respect to this curve 10 which is measured in a horizontal direction as these curves are drawn, is in effect started from zero at the termination of the working as shown by the dashed line C–1 returning to the left from the end of the working portion of path c. The cooling or quenching therefore starts from this higher temperature in effect at time zero with respect to the original position of the curve 10, and hence can be effected in a normal manner without danger of intersecting any portion of this curve as indicated by the cooling or quenching path C–2. By the same token, this cooling does not involve the danger of transformation of any substantial part of the austenite to any of the various intermediate temperature transformation products such as bainite, etc., as is apparent from the drawing. It is necessary, of course when operating in this high temperature working region to conduct the chilling or quenching operation immediately after the working and without sufficient intervening time for the effects of the working on the material of the specimen to be erased by an annealing operation or its equivalent. Thus the quenching or chilling must, in the normal course, occur immediately following the termination of the working; and further the working itself may not be so protracted as to cause undesired results.

Turning now to FIG. 3, there is shown a composite TTT curve 11 having an upper lobe 13 and a lower lobe 12 as aforesaid. Here the critical temperature as to working is the temperature of the nose of the upper lobe shown at 23. Thus in this figure the path a is one illustrating the operation or action of a process wherein the working is effected at a temperature below that of the nose 23 of the curve 13. Working in this path will result in a shifting of the position of the lower lobe 12 of the curve 11 to the dashed line curve shown at 24. Thus at the termination of the working in accordance with path a, the quenching line portion of path a, shown at 25, will intersect the shifted position 24 of the curve 11; and there will result some transformation of the material of the specimen to lower temperature transformation products, such as bainite. This partial transformation to bainite is undesired in accordance with this aspect of the invention where, as in this instance, martensite is the end product desired.

However, if the working is done in the area of critical temperature range between the horizontal temperature lines $A_1$ and $A_3$ (which have the same meaning as set out in discussing FIG. 2 of the drawings), the working is accomplished as shown by path b, with a resultant change or shift in the position of the lower lobe 12 to the dotted line position shown at 26. Under these circumstances and as this shift is substantially less than was occasioned by lower temperature working (path a) the cooling or quenching portion of path b, shown at 27, will not intersect the dotted curve 26, so that there will be no contamination of the end martensitic product by any higher temperature tranformation products, such as bainite.

Again if the working is conducted in the high temperature zone above the temperature indicated by the line $A_3$ and in the stable zone of austenite, the action is effected as shown by path c without any substantial shift in the position of the lobe 12 of the curve 11. Furthermore, at the termination of the working, the conditions are substantially the same as at time zero, so that if the working is not too long protracted and if the cooling or quenching is carried on without any substantial delay, the cooling will follow the cooling portion 28 of the path c without any contamination of the martensitic end product by any higher temperature transformation products, such as bainite.

In FIG. 4 there is shown a still further type of TTT curve here one including a bay 17 between upper and lower lobes 16 and 15, respectively. Again it is the temperature of the nose of the curve lobe 16 at about the point 29 which is critical in this case, and wherein working must be so accomplished as to prevent the formation of low temperature products other than martensite. If the working is effected as indicated by path a, the lower lobe 15 will be shifted as above described from the full line position of curve 15 to that shown by the dashed line 30. This is not a serious difficulty in the case of light or relatively thin samples, but may cause very great difficulty in the case of relatively heavy or thicker samples. The curve path a and the shifted position 30 indicate the conditions which may obtain when using such relatively heavy samples. Here it will be seen that the cooling portion 31 of path a will intersect the shifted lobe 30, resulting in contamination of the specimen by transformation products, such as bainite. Again in FIG. 4, path b shows a path in the critical zone, that is between the temperature $A_1$ and $A_3$, wherein the working portion of this path is wholly above the temperature nose 29 of the upper curve 16. Under these circumstances the shift of the lower lobe 15 is from the position shown in full line 15 to that of the dotted line curve 32, so that the working can be completed as indicated on the drawing and then the product chilled or quenched along the line 33 without intersecting any portion of the dotted curve 32 and hence without introducing any low temperature transformation products such as bainite, the final material being substantially all martensite with a minimum of retained austenite.

Again, if the working is done at a temperature above the level indicated by the line $A_3$, i.e., in the stable austenite zone, the working is characterized by path c in which the operation is substantially the same as path c, as described above for FIGS. 2 and 3, with a quenching to follow immediately after the working and in effect to start at time zero, assuming of course that the working itself is not unduly protracted and that there is not an undue time interval between the termination of the working and the start of the quenching operation.

Following the quenching of the samples which is ordinarily accomplished in air or in oil at least down to room temperature, some further portion of the retained austenite may, if desired, be converted to martensite by refrigerating the sample, for example, by reducing its temperature by ordinary refrigeration tecnhiques to any attainable low temperature, including, for example, the immersing of the article in liquid nitrogen, which carries the temperature of the product down to the boiling point of liquid nitrogen, i.e., about −325° F. Other liquid gases may be used for refrigeration including $CO_2$, He, $H_2$ or $O_2$.

If it is desired to convert the ultimate or maximum amount of austenite to martensite, then advantage can be taken of a repetitious or cyclic process in which it is refrigerated as aforesaid, then heated up to about the tempering temperature, and again chilled and refrigerated. In the usual case, about two such cycles will attain the optimum amount of conversion.

We have found that as a result of the hot-cold working which is accomplished as aforesaid, certain of the physical or mechanical properties of the products will be enhanced to a very substantial extent as shown in examples which follow. We have also found that the effect of mechanical deformation or working is to some extent proportional to the amount of such deformation or working to which the sample is subjected. In order to secure a minimum actual and appreciable amount of improvement there must be at least about 10% deformation based upon the physical dimensions of the specimen prior to such deformation. The maximum is much higher with a practical working range or preferred amount of deformation being in the order of magnitude of about 50–90%.

The mechanical working which is carried on in accordance with this aspect of the invention can be effected in a number of different ways, all of which are known generally for the mechanical working of steel and alloys thereof under other conditions, such for example as by forging, rolling, extruding, drawing or by any other methods of working metals which have been known and which may be desired for a given production. A desired feature of the invention is that the products formed in accordance with this present process have a very high toughness characteristic as indicated by their notch tensile strengths.

The steels of this invention may be processed in any of the three typically distinct ways above discussed, for imparting various combinations of strength, ductility and toughness, the choice depending on the particular combination of properties desired. Thus the steels may be subjected to the simple martensitic heat treatment above described consisting in austenitizing, quenching to martensite and thereupon tempering or aging. Alternatively the steel may be austenitized and thereupon mechanically worked and quenched under conditions avoiding partial formation of intermediate products, such as bainite, to provide a worked, substantially fully martensitic structure, which thereupon can be tempered or aged. Lastly, the steels may be austenitized and cooled or quenched to an intermediate temperature productive of a bainitic structure on isothermal transformation, and held at such temperature for a duration sufficient to transform the austenite to a fully or substantially complete bainitic structure.

It is to be noted, however, that the mechanical working above described with reference to FIGS. 2–4, inc., may also advantageously be employed as an adjunct to subsequent transformation of the austenite to bainite in the processing last mentioned.

The following Table I gives examples of typical steels according to the invention which may be so heat treated with or without elevated temperature mechanical working as aforesaid, while the subsequent Tables 2 and 3 give the room temperature mechanical properties of these steels as heat treated by austenitizing, quenching to martensite and thereupon tempering, but without the introduction of elevated temperature mechanical working. The test results reported in Tables 2 and 3 were obtained by using flat strip test specimens of about 0.080 inch in thickness, about 0.3 inch in width, and long enough to give a central test portion (between end gripping portions) of about two (2) inches.

The notch tensile specimens were formed as set out in detail in the copending application of Tarwater above-referred to and the tests of such specimens were made as described in said Tarwater application.

The heat treatment of the test specimens in each instance comprised the following steps:

(a) Austenitized at the temperature as set forth in Tables 2 and 3;

(b) the specimens were then oil quenched to about room temperature (75° F.);

(c) the specimens were then refrigerated to a temperature of about −120° F. for two hours;

(d) the specimens were then tempered at 400° F. to obtain the results set out in Table 2 and at 600° F. to give the results set out in Table 3, in each instance for one hour; then air cooled to room temperature; then retempered to same tempering temperature for one hour; and then air cooled to room temperature;

(e) the specimens were then finish-ground to exact dimensions desired for the test pieces which were of the size given above;

(f) the stresses introduced by grinding were then relieved by tempering at a temperature 50° F. lower than the tempering temperature hereinabove set out for each specimen respectively; and (g) the specimens were then tested in a conventional manner to give the results set out in Tables 2 and 3.

TABLE 1

| Steel | C | Ni | Co | Mn | Si | Cr | Mo | V | Al | Cb |
|---|---|---|---|---|---|---|---|---|---|---|
| a. | 0.23 | 9.5 | 2 | 0.20 | 0.20 | 0.25 | 0.30 | 0.10 | 0.01 | 0 |
| b. | 0.40 | 9 | 3 | 0.20 | 0.20 | 0.20 | 0.25 | 0.10 | 0.01 | 0 |
| c. | 0.62 | 7.7 | 5 | 0.20 | 0.20 | 0.10 | 0.20 | 0.10 | 0.01 | 0 |
| d. | 0.15 | 8.75 | 3.50 | 0.30 | 0.20 | 0.32 | 0.35 | 0.008 | 0 | 0 |
| e. | 0.65 | 8.82 | 6.80 | 0.46 | 0.21 | 0.30 | 0.31 | 0.11 | 0 | 0 |
| f. | 0.42 | 7 | 0.48 | 0.33 | 0.15 | 0.10 | 0.23 | 0.13 | 0.3 | 0 |
| g. | 0.45 | 12 | 5 | 0.14 | 0.005 | 0.30 | 0.34 | 0.15 | 0 | 0 |
| h. | 0.31 | 7.9 | 0.2 | 0.21 | 0.01 | 0.27 | 0.46 | 0.10 | 0 | 0 |
| i. | 0.53 | 8 | 7 | 0.32 | 0.25 | 0.37 | 0.14 | 0.08 | 0.01 | 0 |
| j. | 0.48 | 9.2 | 5.5 | 0.38 | 3 | 0 | 0.46 | 0.34 | 0.02 | 0 |
| k. | 0.25 | 10 | 1.25 | 2 | 0.23 | 0.35 | 0.29 | 0.07 | 0.09 | 0 |
| l. | 0.40 | 8.95 | 3.87 | 0.20 | 0.17 | 1 | 0.14 | 0.11 | 0 | 0 |
| m. | 0.38 | 8.72 | 1.94 | 0.20 | 1.94 | 0.61 | 0.6 | 0.005 | 0 | 0 |
| n. | 0.50 | 8.2 | 2.3 | 0.4 | 0.23 | 0.08 | 0.05 | 0.20 | 0.1 | 0 |
| o. | 0.40 | 9 | 3 | 0.20 | 0.20 | 0.20 | 0.25 | 0.10 | 0.01 | 0.4 |
| p. | 0.40 | 9 | 3 | 0.20 | 0.20 | 0.20 | 0.25 | 0.10 | 0.01 | 0.04 |
| q. | 0.40 | 9 | 3 | 0.20 | 0.20 | 0.20 | 0.25 | 0.10 | 2 | 0 |
| r. | 0.40 | 1.73 | | 0.68 | 0.30 | 0.84 | 0.25 | | | |
| s. | 0.40 | 1.11 | | 1.13 | 1.82 | 2.14 | 0.33 | | | |
| t. | 0.30 | 5.14 | | 1.16 | 1.57 | 2.36 | 0.35 | 0.07 | | |
| u. | 0.65 | 5.26 | | 0.17 | 0.19 | 0.18 | 0.28 | | 0.19 | |

TABLE 2

All specimens austenitized at 1,450–1,600°F., quenched and tempered one hour at 400°F.

| Steel | Y.S., K s.i. | U.S., K s.i. | Percent El. (in 2") | Percent R.A. | Hardness (Rc No.) | Notch Ten. Str., K s.i. |
|---|---|---|---|---|---|---|
| a. | 195 | 230 | 8 | 48 | 46.5 | 195+ |
| b. | 245 | 290 | 7 | 35 | 54 | 300 |
| c. | 295 | 330 | 5 | 25 | 56 | 100 |
| d. | 165 | 195 | 8 | 60 | 41 | 165+ |
| e. | 298 | 335 | 6 | 30 | 56.5 | 100 |
| f. | 235 | 280 | 7 | 40 | 54 | 260 |
| g. | 250 | 290 | 7 | 40 | 54.5 | 255 |
| h. | 205 | 230 | 7 | 48 | 46 | 300+ |
| i. | 265 | 320 | 6 | 30 | 56.5 | 150 |
| j. | 295 | 330 | 5 | 35 | 57 | 100+ |
| k. | 210 | 240 | 7 | 50 | 46 | 210+ |
| l. | 250 | 295 | 7 | 40 | 54.5 | 250+ |
| m. | 245 | 290 | 7 | 45 | 53.5 | 260+ |
| n. | 255 | 310 | 6 | | 55.5 | 250+ |
| o. | 250 | 295 | 7 | 40 | 54.5 | 300 |
| p. | 247 | 292 | 7 | 37 | 54 | 300+ |
| q. | 245 | 290 | 6 | 35 | 54.5 | 230 |

TABLE 3

All specimens austenized at 1,450–1,600°F., quenched and tempered one hour at 600°F.

| Steel | Y.S., K s.i. | U.S., K s.i. | Percent El. (in 2") | Percent R.A. | Hardness (Rc No.) | Notch Ten. Str., K s.i. |
|---|---|---|---|---|---|---|
| a. | 195 | 220 | 8 | 50 | 46 | 195+ |
| b. | 230 | 250 | 7 | 51 | 51 | 260+ |
| c. | 255 | 280 | 6 | 53 | 53 | 200 |
| d. | 165 | 180 | 8 | 63 | 40 | 165+ |
| e. | 260 | 270 | 6 | 40 | 53.5 | 200 |
| f. | 230 | 260 | 7 | 50 | 51 | 260+ |
| g. | 238 | 270 | 7 | 45 | 52 | 260+ |
| h. | 195 | 210 | 7 | 55 | 46 | 195+ |
| i. | 250 | 275 | 6.5 | 53 | 45 | 250+ |
| j. | 280 | 325 | 5.5 | 40 | 55 | 150 |
| k. | 215 | 230 | 7 | 53 | 45 | 215+ |
| l. | 240 | 260 | 7 | 53 | 50 | 240 |
| m. | 235 | 260 | 7 | 55 | 51 | 240 |
| n. | 235 | 260 | 7 | 40 | 51.5 | 250 |
| o. | 235 | 270 | 7 | 45 | 51.5 | 250 |
| p. | 230 | 260 | 7 | 42 | 51 | 250 |
| q. | 270 | 300 | 5 | 35 | 54 | 150 |

TABLE 4

MECHANICAL PROPERTIES OF HOT-COLD-WORKING STEELS

| Steel | Aus. Temp., °F. | Deformation °F. | Deformation Percent | Tempering Temp. (°F.) | Y.S., K s.i. | U.S., K s.i. | Per-cent El. | Per-cent R.A. | Hard Rc | Notch Ten. Str., K s.i. |
|---|---|---|---|---|---|---|---|---|---|---|
| a. | 1,600 | 1,350 | 10 | 400 | 210 | 220 | 7 | 40 | 47 | |
| | 1,600 | 1,350 | 80 | As Q | 240 | 251 | 5 | 22 | 53 | |
| | 1,600 | 1,350 | 80 | 400 | 220 | 239 | 5 | 31 | 50 | 221+ |
| | 1,600 | 1,350 | 90 | 400 | 230 | 250 | 6 | 36 | 50 | 230+ |
| b. | 1,450 | 1,350 | 10 | 400 | 255 | 298 | 7 | 36 | 55 | |
| | 1,450 | 1,300 | 80 | As Q | 252 | 390 | | | | 80 |
| | 1,450 | 1,300 | 80 | 250 | 260 | 380 | | | | 150 |
| | 1,450 | 1,300 | 80 | 400 | 280 | 325 | | | | 300+ |
| | 1,450 | 1,350 | 90 | 400 | 295 | 340 | 6 | 40 | 56 | 295+ |
| c. | 1,550 | 1,350 | 80 | As Q | 295 | 450 | 6 | | 67 | 50 |
| | 1,550 | 1,350 | 80 | 400 | 310 | 410 | 5 | | 61 | 260 |
| | 1,550 | 1,350 | 80 | 600 | 300 | 360 | 5 | | 59 | 260 |
| | 1,550 | 1,350 | 90 | 400 | 330 | 420 | 6 | | 62 | 265+ |
| j. | 1,500 | 1,350 | 80 | As Q | 300 | 430 | 6 | | 63 | 50 |
| | 1,500 | 1,350 | 80 | 600 | 310 | 390 | 5 | | 59 | 250 |
| r. | 1,550 | | | [1]R.T. | 245 | 340 | 4 | | 60 | |
| | 1,550 | 1,350 | 55 | R.T. | 225 | 380 | 6 | | 63 | |
| | 1,550 | | | 400 | 242 | 295 | 6 | | 54 | |
| | 1,550 | 1,350 | 55 | 400 | 252 | 330 | 6 | | 56 | |
| s. | 1,750 | | | R.T. | 240 | 360 | 2 | | 59 | |
| | 1,750 | | | 400 | 242 | 305 | 6 | | 57 | |
| | 1,750 | | | 600 | 245 | 290 | 7 | | 55 | |
| | 1,750 | 1,150 | 75 | R.T. | 195 | 400 | 6 | | 63 | |
| | 1,750 | 1,150 | 75 | 400 | 260 | 360 | 6 | | 62 | |
| | 1,750 | 1,150 | 75 | 600 | 295 | 330 | 5 | | 59 | |
| | 1,750 | 1,750 | 80 | R.T. | 200 | 390 | 7 | | 62 | |
| | 1,750 | 1,750 | 80 | 400 | 264 | 323 | 6 | | 61 | 260 |
| | 1,750 | 1,750 | 80 | 700 | 274 | 308 | 4 | | 56 | 250 |
| t. | 1,600 | 1,300 | 80 | R.T. | 205 | 336 | 6 | | 62 | |
| | 1,600 | 1,300 | 80 | 250 | 194 | 333 | 7 | | 60 | |
| u. | 1,550 | 1,350 | 80 | 250 | 281 | 435 | 6 | | 67 | |
| | 1,550 | 1,350 | 80 | R.T. | 280 | 450 | 7 | | 67 | |
| | 1,550 | 1,350 | 80 | 400 | 310 | 375 | 5 | | 64 | |

[1]R.T. stands for Room Temperature (about 75°F.).

The effect of subjecting the steels to mechanical working in accordance with the procedures above described with reference to FIGS. 2, 3 and 4 of the drawings, prior to quenching to martensite and thereafter aging or tempering, is shown by the test results in the foregoing Table 4, as applied to the designated steels having the compositions given in Table 1 In the Table 4 data all steel specimens were austenitized in the temperature range of 1450–1750° F., and after quenching, all specimens indicated as having been tempered, were tempered for one hour at the temperature indicated.

Additional data is included in Table 4a for steel b, which was processed as follows: Mechanical working in accordance with the procedures above described with reference to FIGS. 2–4, inc., of the drawings prior to quenching to an intermediate temperature of 500° F. and transforming substantially completely to bainite, cooling thence to atmospheric temperature, and thereafter aging for one hour at 500° F.

TABLE 4A

| Steel | Aus. Temp., °F. | Deformation °F. | Deformation Percent | Tempering Temp. (°F.) | Y.S., K s.i. | U.S., K s.i. | Per-cent El. | Per-cent R.A. | Hard Rc | Notch Ten. Str., K s.i. |
|---|---|---|---|---|---|---|---|---|---|---|
| b. | 1,450 | 1,300 | 10 | [1]500 | 230 | 270 | 7.5 | — | 54 | 300+ |
| | 1,450 | 1,300 | 80 | [1]500 | 250 | 320 | 8.5 | — | 57 | 320+ |

[1]Isothermal transformation temperature.

It will readily be apparent from a comparison of the test results of Tables 2 and 3 with that of Table 4, that the mechanical working greatly enhances the strength and toughness of these steels as thus processed.

The following Table 5 gives the room temperature tensile properties of a series of low carbon steels according to the invention, each as heat-treated by austenitizing,

TABLE 5

| Heat No. | Composition Percent Bal. Fe C | Si | Ni | Cr | Mo | Co | Other | Optimum Heat Treated Tensile Properties K s.i. Y.S. | U.S. | Percent R.A. | El. | Hard Rc |
|---|---|---|---|---|---|---|---|---|---|---|---|---|
| 59° | .1 | .1 | 9 | | 3 | 3 | | 177 | 196 | 62 | 16 | 37 |
| 63 | .2 | .3 | 9 | .1 | 1 | 4 | | 193 | 200 | 67 | 18 | 43 |
| 203° | .15 | 1.0 | 9 | .3 | 1 | 3 | | 196 | 209 | 59 | 15 | 44 |
| 200° | .2 | .5 | 9 | 1.5 | 1 | 3 | | 197 | 208 | 54 | 15 | 43 |
| 64 | .2 | .3 | 9 | .1 | 1 | 4 | | 200 | 207 | 65 | 16 | 46 |
| 114° | .26 | .1 | 7.1 | .9 | 1 | 2.1 | .07 Al | 191 | 214 | 54 | 14 | 43 |
| 168 | .12 | .2 | 8.7 | .2 | 3 | 3 | {.2 Cb .1 Ta} | 195 | 211 | 53 | 14 | 41 |
| 201° | .2 | 1.0 | 9 | .3 | 1 | 3 | | 214 | 218 | 54 | 14 | 45 |
| 112° | .24 | .1 | 7.5 | .3 | .2 | 2.3 | .07 Al | 186 | 222 | 60 | 14 | 43 |
| 116° | .25 | .1 | 7.4 | .9 | 1 | 4.4 | .07 Al | 203219 | | 64 | 17 | 46 |
| 202° | .20 | 1.0 | 9.0 | 1.5 | 1 | 3.0 | | 205 | 229 | 52 | 14 | 48 |
| 204° | .15 | 1.0 | 9.0 | .3 | 1 | 3.0 | | 213 | 222 | 58 | 12 | 44 |
| 154 | .1 | .1 | 7.3 | .3 | .3 | 2.0 | | 188 | 220 | 60 | 14 | 45 |
| 155 | .2 | | 7.3 | 1.0 | .3 | 2.0 | | 185 | 224 | 48 | 14 | 46 |
| 60° | .2 | .1 | 9 | | 3 | 3 | | 210 | 229 | 55 | 15 | 46 |
| 123° | .27 | .1 | 8.1 | .9 | 3.3 | 1.9 | .07 Al | 211 | 223 | 63 | 16 | 46 |
| 67 | .3 | 1.0 | 7.5 | .1 | .2 | 2 | | 188 | 230 | 69 | 15 | 46 |
| 115° | .33 | .1 | 7.4 | .9 | 1 | 4.4 | .07 Al | 206 | 231 | 52 | 15 | |
| 166 | .22 | .2 | 8.7 | 1.5 | 1.0 | 3.0 | {.2 Cb .1 Ta} | 180 | 220 | 59 | 16 | 37 |
| 161° | .24 | .2 | 7.6 | 2.0 | 2.0 | 3.1 | | 197 | 229 | 54 | 14 | 44 |
| 119° | .41 | .1 | 6.9 | 1.8 | 3.2 | 2.0 | .07 Al | 196 | 232 | 55 | 14 | 47 |
| 121° | .25 | .1 | 7.2 | 1.0 | 1.4 | 2.5 | .07 Al | 190 | 235 | 59 | 15 | 47 |
| 124° | .25 | .1 | 8.6 | 1.8 | 3.3 | 2.0 | .07 Al | 200 | 240 | 55 | 14 | 48 |
| 118° | .29 | .1 | 7.0 | 1.0 | 3.5 | 4.1 | .1 Al | 206 | 243 | 50 | 12 | 47 |
| 117° | .27 | .1 | 6.4 | .9 | 2.7 | 2.0 | .07 Al | 201 | 245 | 53 | 13 | 48 |
| 120° | .30 | .1 | 6.4 | 1.8 | 3.3 | 3.8 | .07 Al | 224 | 245 | 55 | 14 | 49 |
| 162° | .25 | 1.0 | 7.6 | 1.0 | 1.0 | 3.1 | | 205 | 250 | 49 | 13 | 47 |
| 122° | .28 | .1 | 8.0 | .6 | 3.2 | 2.0 | .1 Al | 205 | 247 | 50 | 12 | 49 |
| 157 | .23 | | 7.3 | 2 | 3 | 2 | | 199 | 247 | 47 | 12 | 49 |
| 158° | .24 | | 7.3 | 2 | 3 | 4 | | 204 | 248 | 53 | 14 | 46 |
| 199° | .2 | .5 | 9 | .3 | 1 | 3 | | 211 | 251 | 60 | 13 | 49 |
| 160° | .18 | .2 | 7.6 | 2 | 1 | 3.1 | | 194 | 277 | 55 | 15 | 47 |
| '607 | .22 | .1 | 7.2 | .7 | .8 | 3.8 | .05 Cb | 183 | 202 | 67 | | |
| '609 | .21 | | 7.3 | .7 | 1.5 | 3.2 | .05 Cb | 195 | 214 | 62 | | |
| '611 | .14 | .1 | 7.3 | .7 | 3.0 | 3.3 | .09 Cb | 178 | 200 | 55 | | |
| '612 | .28 | | 8.2 | .4 | .5 | 3.8 | .11 Cb | 186 | 195 | 51 | | |
| '613 | .24 | | 8.6 | .4 | .4 | 4.0 | .04 Cb | 188 | 198 | 61 | | |
| '614 | .24 | | 8.1 | .4 | .5 | 3.7 | | 182 | 193 | 65 | | |
| '615 | .27 | | 8.2 | .4 | .5 | 4.0 | .08 Cb | 125 | 185 | 59 | | |
| A355 | .26 | .1 | 8.0 | 1.0 | 1.0 | 2.7 | | 200 | 215 | 51 | | |

quenching and tempering, and in the case of the heats marked wtih the asterisk, also refrigerated at −120° F. for two hours prior to tempering, although this is not usually required for these low carbon steels. The tempering times were two hours each and the tempering temperatures were all within the range of 400–1000° F., and so selected as to each heat to give about the optimum combination of high strength with high ductility as measured by percent reduction in area and tensile elongations. The manganese and vanadium contents for these steels (not given in the table) were within limits of about 0.1–0.5% for manganese and about 0.1–0.2% for vanadium.

The Charpy V-notch impact energies for the above steels '607–A355, inc., were as shown in the following Table 5a, at the several testing temperatures indicated for each.

TABLE 5a

| Heat No. | CVN Impact Energy, Ft.-lbs. as tested at- 70° F. | 0° F. | −100° F | −320° F. |
|---|---|---|---|---|
| '607 | 60–70 | 73 | 68 | 47 |
| '609 | 45–50 | 51 | 54 | 44.48 |
| '611 | 40 | 36 | 28 | 10 |
| '612 | 35–42 | 45 | 45 | 41 |
| '613 | 48–57 | 62 | 56 | 49 |
| '614 | 59 | 67 | 64 | 47 |
| '615 | 59 | 68 | 64 | 47.5 |
| 'A355 | 59 | | | 42 |

From the test data of the above Tables 5 and 5a it will be seen that both the yield and ultimate strengths of these low carbon steels increase with increasing additions of chromium and molybdenum without appreciable loss of ductility, and also that these steels possess excellent toughness properties.

The Table 5 data also shows that the strength increases with the carbon content with the same effects on strength, ductility and toughness as increasing chromium and molybdenum additions as above discussed.

The combinations of strength, ductility and toughness provided by those low carbon steels, is such that they are particularly suited for applications where weight reductions due to high strength are desired, but where reliability cannot be sacrificed. These steels have extremely high toughness values as measured by sharply notched specimens, being tougher than any other steels of comparable strengths of which applicants are aware. Also they can be welded in the heat-treated condition without preheating or postheating. With reference to this, applicants are aware of no other steels which at strength levels in excess of 170 k.s.i. can be welded satisfactorily without preheating and/or post-welding heat treatments. For the foregoing reasons these low carbon steels of the invention find particular utility for such applications as solid fuel rocket motor cases and for pressure vessels which are subject to high external pressure and impact in use.

As pointed out above, the steels of this invention have greater toughness when heat-treated to provide bainitic structures as compared to those heat-treated to provide tempered martensitic structures at comparable strength levels, and provided always, of course, that the comparison is made on the basis of a steel of substantially the same composition. For example, our tests have shown that the Charpy V-notch impact toughness of the steel in accordance with the invention containing substantially 9% nickel, 4% cobalt is 100% improved in bainitic structures over that of tempered martensitic structures. The higher toughness of bainitic structures was also observed when the materials were tested using sharply notched specimens. $K_{IC}$ values of the order of 90 k.s.i. $\sqrt{in.}$ were obtained in bainitic structures, whereas $K_{IC}$ values of only 65 k.s.i. $\sqrt{in.}$ were obtained in martensitic structures. Both of these values were for steels heat-treated to yield strength levels of 225 k.s.i.

In confirmation of the above and in order to make a direct comparison of the toughness characteristics of bainitic versus tempered martensitic structures in steels according to the invention of substantially the same composition, heats of the final analyses given in the following Table 6 were melted, all containing substantially 8–9% nickel, 3–4% cobalt, approximately 0.4% carbon and the balance iron, except for extremely small amounts of manganese, silicon, chromium, molybdenum, vanadium and aluminum.

TABLE 6

| Heat Number | COMPOSITION (WEIGHT PERCENT) C | Mn | Si | Ni | Cr | Mo | V | Co | Al |
|---|---|---|---|---|---|---|---|---|---|
| 3352127 | 0.41 | 0.22 | 0.26 | 8.25 | 0.26 | 0.13 | 0.10 | 3.60 | 0.20 |
| 3950701 | 0.40 | 0.11 | 0.01 | 8.84 | 0.32 | 0.32 | 0.08 | 3.82 | |
| 3950704 | 0.39 | 0.12 | 0.01 | 8.72 | 0.29 | 0.31 | 0.08 | 3.80 | |
| 3950831 | 0.43 | 0.02 | 0.01 | 8.00 | 0.09 | 0.08 | 0.09 | 3.80 | 0.01 |

All of the above heats were air-melted in a 70-ton electric arc furnace, heat '127 being aluminum-silicon deoxidized and the remaining heats carbon deoxidized, and the latter also consumable electrode remelted under vacuum.

The strength and notch toughness of these various heats as heat-treated to provide tempered martensitic vis-a-vis bainitic structures is set forth in the following Table 7, while the strength and impact resistance of these steels is set forth in the ensuing Table 8.

TABLE 7

STRENGTH AND NOTCH TOUGHNESS OF VARIOUS HEATS

| Structure | Y.S. (K s.i.) | U.T.S. (K s.i.) | Percent El. (in 2") | Hardness (Rc) | t=0.080" Notch Str. (K s.i.) | t=0.180" Notch Str. (K s.i.) |
|---|---|---|---|---|---|---|
| Heat 3352127: | | | | | | |
| MT* at 400 F | 235.5 | 293.5 | 6.5 | 54 | 144.6 | 62.8 |
| MT at 500 F | 230.0 | 265.5 | 6.5 | 50 | | 73.8 |
| MT at 600 F | 224.5 | 247.0 | 6.0 | 47 | 186.8 | 76 |
| MT at 800 F | 202.0 | 213.0 | 7.0 | 44 | | 136.5 |
| BF** at 450 F | 205.4 | 260.0 | 6.5 | 48.5 | 185.2 | |
| BF at 500 F | 200 | 240 | 7.0 | 47 | 198.0 | 149.6 |
| BF at 600 F | 172.5 | 205.3 | 7.0 | 40 | 176.5 | |
| Heat 3950704: | | | | | | |
| MT at 400 F | 232.3 | 291.0 | 6.5 | 49 | 153.0 | 91.9 |
| MT at 500 F | | | | 49 | 147.0 | 112.3 |
| MT at 600 F | | | | 46.5 | 159.0 | 145.5 |
| MT at 800 F | | | | 42 | 160.0 | 180.8 |
| MT at 1,000 F | | | | 42 | 179.0 | |
| Heat 3950704: | | | | | | |
| BF at 450 F | 197.5 | 259.0 | 6 | 46.5 | 197.5 | 147.5 |
| BF at 500 F | 196.0 | 239.8 | 6 | 46 | | 186.3 |
| BF at 600 F | 164.5 | 195.4 | 7 | 39.5 | | 171.0 |
| Heat 3950831: | | | | | | |
| MT at 400 F | 246.0 | 289.4 | 6 | 53 | 152.8 | 84.2 |
| MT at 500 F | 232.2 | 259.7 | 5.5 | 50 | 183.0 | 114.2 |
| MT at 600 F | 218.4 | 236.4 | 5 | 46 | 183.0 | 172.1 |
| BF at 500 F | 223.5 | 248.5 | 7 | 50 | | 202.2 |
| BF at 600 F | 187.3 | 201.5 | 9.5 | 44 | | 170.9 |
| BF at 700 F | 138.6 | 158.2 | 12 | 36 | | 156.7 |

t Indicates thickness of center notched specimen.
*MT indicates Martensite tempered at indicated temp.
** BF indicates Bainite formed at indicated temp.

TABLE 8

STRENGTH AND IMPACT RESISTANCE OF VARIOUS HEATS

| Structure | Y.S. (K s.i.) | U.T.S. (K s.i.) | Percent El. (in 2") | Hardness Rc) | Imp. Fn. (ft.-lb.) at 70° F. |
|---|---|---|---|---|---|
| Heat 3352127: | | | | | |
| MT* at 400 F | 235.5 | 293.5 | 6.5 | 54 | |
| MT at 500 F | 224.5 | 247.0 | 6.0 | 47 | |
| BF** at 500 F | 260 | 240 | 7.0 | 47 | 47 |
| Heat 3950701: | | | | | |
| MT at 400 F | 250 | 295 | 7.5 | 80 | 20 |
| MT at 600 F | 230 | 255 | 7.5 | 47.5 | 22 |
| BF at 450 F | | | | | 37 |
| BF at 500 F | 205 | 250 | | 48 | 40 |
| Heat 3950831: | | | | | |
| MT at 400 F | 246.0 | 289.4 | 6 | 53 | 21 |
| MT at 500 F | 234.0 | 260.0 | 6 | 60 | 21 |
| Mt at 600 F | 218.4 | 276.4 | 5 | 46 | 26 |
| MT at 800 F | 192.4 | 260.9 | 8.5 | 44 | 37 |
| BF at 450 F | 235.0 | 275 | | | 28 |
| BF at 500 F | 223.5 | 248.5 | 7 | 50 | 46 |
| BF at 550 F | 205.0 | 225.0 | | 47.0 | 63 |
| BF at 600 F | 187.3 | 201.5 | 9.5 | 44.0 | 66 |
| BF at 700 F | 138.6 | 158.2 | 12 | 36.0 | 75 |

*MT indicates Martensite tempered at indicated temp.
**BF indicates Bainite formed at indicated temp.

Typical room temperature tensile properties for the steels of Table 6 as bainitized at various temperatures are shown in FIG. 5. As can be seen, the strength and ductility are strongly dependent on the temperature of austenite to bainite transformation. For example, at 700° F., yield strength levels of the order of 140 k.s.i. were obtained, whereas at 450° F., yield strength levels of the order of 235 k.s.i. were obtained. As might be expected from the strong dependence of strength on transformation temperature, the impact energy exhibited by isothermally transformed specimens varies significantly with the temperature of formation, as shown in the accompanying FIG. 6.

As mentioned previously, the bainitic structures appear to give consistently the best combination of impact resistance and strength. The annexed FIGS. 7 and 8 are plots of impact energy against yield strength and ultimate strength, respectively, for bainitic and martensitic structures of the substantially 9% nickel, 4% cobalt steels of Table 6 containing about 0.4% carbon, as well as for a substantially 9% nickel, 4% cobalt, 0.25% carbon steel heat-treated to martensite, designated in the drawings as HP 9–4–40 and HP 9–4–25, respectively. It is to be noted from these graphs that impact values on the order of 50 ft./lbs. at a yield strength level of 225 k.s.i. and an ultimate strength of 250 k.s.i. can be obtained with bainitic structures in the 9–4–40 steel. On the other hand, only about 25 ft./lbs. was obtained with the tempered martensitic structures in this steel at comparable strength levels. There is, therefore, a 100% improvement in impact properties as a result of forming a bainitic structure instead of a tempered martensitic structure.

The toughness and fatigue properties of steels according to this invention as compared to various competitive steels are graphically depicted in FIGS. 9–11, inc., of the drawings herein as functions of yield or ultimate strength. Referring to FIGS. 9 and 10, it will be seen that the fracture toughness of the HP 9–4–X steels of this invention are far superior at all yield and ultimate strength levels to the majority of the commercial steels set forth. Only the highly alloyed 18 Ni-Co-Mo steels show superiority in the yield strength comparison of FIG. 9, whereas in the ultimate strength comparison basis of FIG. 10, the steels of this invention are superior in fracture toughness at the highest strength levels and of comparable toughness at lower strengths. The reason for the apparent superiority of the 18 Ni-Co-Mo commercial steels when compared on a yield strength basis, is that for these steels the ratio of yield to ultimate strength is close to unity whereas this ratio is much lower in the HP 9–4–X steels of the present invention. Hence, the ultimate strength comparison of FIG. 10 gives more nearly the true comparison of these steels as regards fracture toughness.

Referring to FIG. 11, it will at once be apparent that the HP 9–4–X steels of the present invention are far superior in fatigue resistance at all strength levels to the best of the competitive steels.

Referring to FIG. 12, it will further be seen that the steels of this invention are at least as resistant to stress corrosion cracking as the best of the competitive steels.

Aside from the toughness superiority of the bainitic structure over the tempered martensitic structure shown by the above data, the heat-treating of the steels to bainitic structures offers a significant advantage over conventional procedures because residual transformation stresses are very low with a resulting decrease in quench-cracking tendencies and distortion. Furthermore, heat-treating to fully bainitic structures eliminates retained austenite and consequently the need for refrigeration and double tempering. The steels of the invention as heat-treated to provide the bainitic structure are applicable for such items as airplane landing gears, airframes and small, highly stressed parts.

What is claimed is:

1. An alloy steel consisting essentially of about: 3 to 12% of metal of the group *consisting of* nickel and copper, copper when present not exceeding one-half the nickel content, 0.2 to 7% cobalt, up to 2% each of manganese, chromium and aluminum, up to 1.5% silicon, up to 3.5% molybdenum, up to 0.5% vanadium, up to 0.4% columbium, up to 0.25% tantalum, up to 0.75% tungsten, up to 0.1% boron, [up] *0.1* to 0.3% carbon, and the balance substantially all iron.

2. An alloy steel consisting essentially of about: 0.1 to 0.65% carbon, 3 to 12% of at least one metal of the group *consisting of* nickel and copper, copper when present not exceeding one-half the nickel content, 0.2 to 7% cobalt, up to 2% each of manganese, chromium and aluminum, up to 1.5% silicon, up to 3.5% molybdenum, up to 0.5% vanadium, up to 0.4% columbium, up to 0.25% tantalum, up to 0.75% tungsten, up to 0.1% boron, and the balance substantially all iron, said steel containing at least 0.1% of at least one element selected from the group consisting of chromium, molybdenum, vanadium and columbium for carbon contents thereof over about 0.3% [.] *, at least one of the elements nickel and cobalt being present on the high side of its range when at least one of the elements carbon, chromium and silicon is present on the high side of its range, and said steel as austenitized, quenched and tempered at about 400–1000°F. having yield and ultimate strengths of at least 150 and 180 k.s.i. respectively, a tensile elongation of at least 5%, and a Charpy V-notch impact strength at 70°F of at least 20 ft-lbs.*

3. [An alloy] *A wrought alloy steel having a worked microstructure of transformed austenite selected from the group consisting of martensite and bainite, said* steel consisting essentially of about: 0.1 to 0.65% carbon, 3 to 12% of metal of the group *consisting of* nickel and copper, copper when present not exceeding one-half the nickel content, 0.2 to 7% cobalt, up to 2% each of manganese, chromium and aluminum, up to 1.5% silicon, up to 3.5% molybdenum, up to 0.5% vanadium, up to 0.4% columbium, up to 0.25% tantalum, up to 0.75% tungsten, up to 0.1% boron, and the balance substantially all iron, said steel containing at least 0.1% of at least one element selected from the group consisting of chromium, molybdenum and columbium for carbon contents thereof over about 0.3%, and said steel having [a tempered martensitic microstructure, ] yield and ultimate strengths of at least 150 and 175 k.s.i. respectively, [and] a tensile elongation of at least 5% [.] *, a Charpy V-notch impact strength at 70°F of at least 20 ft-lbs.*

4. An alloy steel consisting essentially of about: 0.1 to 0.65% carbon, [3] *6.5* to [12%] *9.5%* of metal of the group *consisting of* nickel and copper, copper when present not exceeding one-half the nickel content, 0.2 to 7% cobalt, up to 2% each of manganese, chromium and aluminum, up to 1.5% silicon, up to 3.5% molybdenum, up to 0.5% vanadium, up to 0.4% columbium, up to 0.25% tantalum, up to 0.75% tungsten, up to 0.1% boron, and the balance substantially all iron, said steel containing at least 0.1% of at least one element selected from the group consisting of chromium, molybdenum, vanadium and columbium for carbon contents thereof over about 0.3%, and said steel [ having a martensitic microstructure, a tensile elongation of at least 5%, and yield and ultimate strengths of at least 150 and 175 k.s.i., respectively] *as austenitized, quenched and tempered at about 400–1000°F having yield and ultimate strengths of at least 150 and 180 k.s.i. respectively, a tensile elongation of at least 5%, a Charpy V-notch impact strength at 70°F of at least 20 ft-lbs.*

5. An alloy steel consisting essentially of about: 0.1 to 0.65% carbon, 3 to 12% of metal of the group *consisting of* nickel and copper, copper when present not exceeding one-half the nickel content, 0.2 to 7% cobalt, up to 2% each of manganese, chromium and aluminum, up to 1.5% silicon, up to 3.5% molybdenum, up to 0.5% vanadium, up to 0.4% columbium, up to 0.25% tantalum, up to 0.75% tungsten, up to 0.1% boron, and the balance substantially all iron, said steel containing at least 0.1% of at least one element selected from the group consisting of chromium, molybdenum, vanadium, and columbium for carbon contents thereof over about 0.3%, and said steel having a bainitic microstructure, a tensile elongation of at least 5%, yield and ultimate strengths of at least 150 and 175 k.s.i., respectively, and a Charpy V-notch impact energy of at least [30] *20* ft/lbs. *at 70°F.*

6. An alloy steel consisting essentially of about: 0.2 to 0.65% carbon, [3] *6.5* to [12%] *9.5%* of metal of the group *consisting of* nickel and copper, copper when present not exceeding one-half the nickel content, 0.2 to 7% cobalt, up to 2% each of manganese, chromium and aluminum, up to 1.5% silicon, up to 3.5% molybdenum, up to 0.5% vanadium, up to 0.4% columbium, up to 0.25% tantalum, up to 0.75% tungsten, up to 0.1% boron, and the balance substantially all iron, said steel containing at least 0.1% of at least one element selected from the group consisting of chromium, molybdenum, vanadium and columbium for carbon contents thereof over about 0.3%, and said steel having a tempered martensitic microstructure, a tensile elongation of at least 5%, and yield and ultimate strengths of at least 195 and 230 k.s.i., respectively [.] *, and a Charpy V-notch impact strength of at least 20 ft-lbs. at 70°F.*

7. An alloy steel consisting of about: [0.2] *0.1* to 0.65% carbon, 3 to 12% of metal of the group *consisting of* nickel and copper, copper when present not exceeding one-half the nickel content, 0.2 to 7% cobalt, up to 2% each of manganese, chromium and aluminum, up to 1.5% silicon, up to 3.5% molybdenum, up to 0.5% vanadium, up to 0.4% columbium, up to 0.25% tantalum, up to 0.75% tungsten, up to 0.1% boron, and the balance substantially all iron, said steel containing at least 0.1% of at least one element selected from the group consisting of chromium, molybdenum, vanadium and columbium for carbon contents thereof over about 0.3%, and said steel having a substantially bainitic microstructure, a tensile elongation of at least 5%, an ultimate strength of at least 200 k.s.i., and a Charpy V-notch impact energy of at least 50 ft/lbs.

8. An alloy steel consisting essentially of about: 0.1 to 0.65% carbon, 3% to 12% of metal of the group *consisting of* nickel and copper, copper when present not exceeding one-half the nickel content, 0.2 to 7% cobalt, up to 2% each of manganese, chromium and aluminum, up to 1.5% silicon, up to 3.5% molybdenum, up to 0.5% vanadium, up to 0.4% columbium, up to 0.25% tantalum, up to 0.75% tungsten, up to 0.1% boron, and the balance substantially all iron, said steel containing at least 0.1% of at least one element selected from the group consisting of chromium, molybdenum, vanadium and columbium for carbon contents thereof over about 0.3%, and wherein there may be substituted for part or all of any of the elements vanadium, aluminum and silicon, at least one element selected from the group consisting of titanium, zirconium and the rare earth metals [ . ] *, said steel having as austenitized, quenched and tempered at about 400–600°F., yield and ultimate strengths of at least 235 and 280 k.s.i., respectively, and a tensile elongation of at least 5%.*

9. An alloy steel consisting essentially of about: 0.1 to 0.65% carbon, 3 to 12% of [the] metal of the group *consisting of* nickel and copper, copper when present not exceeding one-half the nickel content, 0.2 to 7% cobalt, [0.25] *0* to 2% chromium, [0.25] *0* to 3.5% molybdenum, up to 2% each of manganese and aluminum, up to 1.5% silicon, up to 0.5% vanadium, up to 0.4% columbium, up to 0.25% tantalum, up to 0.75% tungsten, up to 0.1% boron, and the balance substantially all iron [.] *, said steel as austenitized, quenched and tempered at about 400–1000°F, having yield and ultimate strengths of at least 150 and 170 k.s.i., respectively, a Charpy V-notch impact strength at 70° of at least 30 ft-lbs, and a tensile elongation of at least 10%.*

10. An alloy steel consisting essentially of about: 0.1 to 0.3% carbon, 3 to 12% of [the] metal of the group *consisting of* nickel and copper, copper when present not exceeding one-half the nickel content, 0.2 to 7% cobalt, 0.5 to 1.5% each of chromium and molybdenum, up to 2% each of manganese and aluminum, up to 1.5% silicon, up to 0.5% vanadium, up to 0.4% columbium, up to 0.25% tantalum, up to 0.75% tungsten, up to 0.1% boron, and the balance substantially all iron.

11. All alloy steel consisting essentially of about: 0.3 to 0.65% carbon, 3 to 12% of metal of the group *consisting of* nickel and copper, copper when present not exceeding one-half the nickel content, 0.2 to 7% cobalt, 0.25 to 0.5% each of chromium and molybdenum, up to 2% each of manganese and aluminum, up to 1.5% silicon, up to 0.5 % vanadium, up to 0.4% columbium, up to 0.25% tantalum, up to 0.75% tungsten, up to 0.1% boron, and the balance substantially all iron.

12. An alloy steel consisting essentially of about: 0.1 to 0.65% carbon, 6.5 to 9.5% nickel, 1 to 4% cobalt, 0.25 to 1.5% each of chromium and molybdenum, up to 1% each of manganese and silicon, up to 0.5% vanadium, and the balance substantially all iron.

13. An alloy steel consisting essentially of about: 0.1 to 0.65% carbon, 6.5 to 9.5% nickel, 1 to 4% cobalt, up to 1% each of manganese and silicon, up to 1.5% each of chromium and molybdenum, up to 0.5% vanadium and the balance substantially all iron [.] *, said alloy containing at least 0.1% of at least one element selected from the group consisting of Cr, Mo, V and Cb for carbon content over about 0.3%.*

14. An alloy steel consisting essentially of about: 0.1 to 0.5% carbon, 8 to 10% nickel, 3.5 to 4.5% cobalt, up to 1% each of manganese and silicon, up to 0.5% vanadium, up to 1.5% each of chromium and molybdenum, the balance substantially all iron [.] *, said alloy containing at least 0.1% of at least one element selected from*

*the group consisting of Cr, Mo, V and Cb for carbon content over about 0.3%.*

15. An alloy steel consisting essentially of about 0.1 to 0.5% carbon, 7 to 9% nickel, 2 to 4% cobalt, *up to 1.5% each of chromium and molybdenum* and the balance substantially all iron [.] , *said alloy containing at least 0.1% of at least one element selected from the group consisting of Cr, Mo, V and Cb for carbon content over about 0.3%.*

*16. A steel having high yield strength and good notch toughness consisting essentially of .1–.3% carbon, .2–7.% cobalt, 3.–12.% nickel, .5–1.5% molybdenum and .5–1.5% chromium and the balance substantially iron except for residual and incidental impurities.*

*17. Low carbon age hardenable steel consisting essentially of in percentage by weight: carbon .1–.3, nickel 6.5–9.5, molybdenum .1–3.5, cobalt 1–4., manganese 2. max., phosphorous .04 max., sulfur 0.4 max., silicon 1.5 max., aluminum 2. max., with the balance iron and other elements which do not adversely effect the properties.*

*18. An alloy steel consisting essentially of about: 6.5 to 9.5% metal from the group consisting of nickel and copper, with copper not exceeding one half the nickel content, 1 to 4% cobalt, 0.5 to 1.5% each of chromium and molybdenum, 0.1% to under 0.3% carbon, balance iron.*

*19. An alloy steel consisting essentially of about: 6.5 to 9.5% metal from the group consisting of nickel and copper, with copper not exceeding one half the nickel content, 1 to 4% cobalt, 0.25 to 0.5% each of chromium and molybdenum, 0.3 to 0.65% carbon, balance iron.*

* * * * *